United States Patent
Davis

(10) Patent No.: US 11,551,462 B2
(45) Date of Patent: *Jan. 10, 2023

(54) DOCUMENT SCANNING SYSTEM

(71) Applicant: Imaging Business Machines LLC, Birmingham, AL (US)

(72) Inventor: Arthur G. Davis, Hoover, AL (US)

(73) Assignee: Imaging Business Machines LLC, Birmingham, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/651,455

(22) Filed: Feb. 17, 2022

(65) Prior Publication Data

US 2022/0172499 A1    Jun. 2, 2022

Related U.S. Application Data

(63) Continuation of application No. 16/906,753, filed on Jun. 19, 2020, now Pat. No. 11,281,902.

(60) Provisional application No. 62/863,593, filed on Jun. 19, 2019.

(51) Int. Cl.
*G06V 30/413* (2022.01)
*G06K 9/62* (2022.01)
*G06V 10/25* (2022.01)
*G06V 10/75* (2022.01)

(52) U.S. Cl.
CPC ......... *G06V 30/413* (2022.01); *G06K 9/6232* (2013.01); *G06V 10/25* (2022.01); *G06V 10/751* (2022.01)

(58) Field of Classification Search
CPC .... G06V 30/413; G06V 10/25; G06V 10/751; G06V 30/142; G06K 9/6232
See application file for complete search history.

(56) References Cited

U.S. PATENT DOCUMENTS

| | | | |
|---|---|---|---|
| 6,115,509 A * | 9/2000 | Yeskel | G06V 10/993 715/201 |
| 6,847,737 B1 | 1/2005 | Kouri et al. | |
| 7,272,265 B2 | 9/2007 | Kouri et al. | |
| 8,160,393 B2 | 4/2012 | Honsinger et al. | |
| 8,422,788 B2 | 4/2013 | Demandolx et al. | |
| 8,515,171 B2 | 8/2013 | Vantaram et al. | |
| 8,913,831 B2 | 12/2014 | Bergman et al. | |
| 9,025,867 B2 | 5/2015 | Cote et al. | |
| 9,031,319 B2 | 5/2015 | Cote et al. | |
| 9,070,012 B1 | 6/2015 | Sieracki et al. | |
| 9,092,884 B2 | 7/2015 | Demandolx et al. | |
| 9,317,930 B2 | 4/2016 | Kuo et al. | |
| 9,332,239 B2 | 5/2016 | Cote et al. | |
| 2010/0054595 A1 | 3/2010 | Demandolx et al. | |

(Continued)

FOREIGN PATENT DOCUMENTS

WO    WO-02101339 A2    12/2002

*Primary Examiner* — Amandeep Saini
(74) *Attorney, Agent, or Firm* — Harris Beach PLLC

(57) ABSTRACT

A document scanner with the capability of landing a document by determining its location on the scanning bed, using intelligent methodologies for framing the document to determine the edges/boundaries of the document, processing the image using various techniques and methodologies to speed up the processing, so that the document feed track does not have to be slowed, and a unique binarization of the image to efficiently create different renderings of the scanned image.

18 Claims, 28 Drawing Sheets

(56) References Cited

U.S. PATENT DOCUMENTS

| | | |
|---|---|---|
| 2010/0067826 A1 | 3/2010 | Honsinger et al. |
| 2010/0183225 A1 | 7/2010 | Vantaram et al. |
| 2010/0278423 A1 | 11/2010 | Itoh et al. |
| 2012/0033875 A1 | 2/2012 | Bergman et al. |
| 2012/0075440 A1 | 3/2012 | Ahuja et al. |
| 2013/0188876 A1 | 7/2013 | Demandolx et al. |
| 2013/0321700 A1 | 12/2013 | Cote et al. |
| 2013/0322746 A1 | 12/2013 | Cote et al. |
| 2014/0133749 A1 | 5/2014 | Kuo et al. |
| 2015/0296193 A1 | 10/2015 | Cote et al. |
| 2018/0114323 A1* | 4/2018 | Hatstat ................ G06T 7/11 |

* cited by examiner

DOCUMENT SCANNING SYSTEM

BACKGROUND OF THE DISCLOSURE

Field of the Disclosure

The present disclosure is directed to a document scanner having a subsystem for real time capturing of images while still scanning the document.

Description of the Related Art

Scanning of documents for the purpose of creating electronic images is well known in the art. An example is found in U.S. Pat. No. 6,115,509 to Yeskel.

Throughput is the never-ending challenge of scanners, particularly with OCR (optical character recognition). Users always desire higher throughput but not at the expense of errors, which cause significant slowdowns in processing. Therefore, there needs to be a way to enhance throughput while minimizing errors.

INCORPORATION BY REFERENCE

This application incorporates by reference in their entirety the patent applications upon which it is based:
U.S. Ser. No. 16/906,753 filed 19 Jun. 2020 Document Scanning System
U.S. Ser. No. 62/863,593 filed 19 Jun. 2019 Document Scanning System

BRIEF SUMMARY

Introduction

The disclosure encompasses many embodiments. One such embodiment is detailed below in summary fashion. This summary does not encompass the entire disclosure, but it may assist the reader in reviewing this disclosure and examining the associated claims.

A system, apparatus and method of creating electronic images from physical items captured using a line scan camera is described here.

Document imaging transports are designed to move an object at a given speed and synchronize the camera sensor array with respect to the moving object. Typically, images are posted to the application after the end of the capture frame (fully scanned image). High-speed scanning devices have required specialized imaging hardware to operate efficiently at the required data rate of the capture system and even such hardware solutions are unable to keep up with ever increasing throughput demand.

These legacy systems have inherent latency in that the images cannot be analyzed, compressed, and posted to the application until after the end of each frame, which slows down throughput. Keep in mind, that merely scanning digitizing what is in front of the camera is not enough. The boundaries (frame) of the document must be determined as well as other processing steps are required to be done accurately since the original document, if not flagged for a scanning error may be long destroyed by the time the scanning error is discovered. Therefore, as throughput is increased, it is essential that reliable image capture be assured and maintained.

In light of this, this disclosure introduces a mode that allows for direct transfer of the pixels from the camera into host computer memory, to be utilized for real-time processing while the item is still in the capture, and before end of the frame. Using commoditized, off-the-shelf hardware, raw camera data can be transferred to the host computer. Advancements in the field of hardware and software processing allow for the image processing to execute in real-time using host computer resources by employing methods and systems incorporated herein. The scanned image can be utilized for different applications by using post-processing techniques such as background thresholding, color analyzation, and color processing. Various techniques employing vector processing contribute to a highly efficient method of image data processing without creating specialized hardware and yet gain throughput which heretofore was impossible. Likewise, there is a need to find the boundaries of documents which are to be scanned so that important data is not lost and irrelevant data (such as background colors or the image track) are inadvertently stored.

This disclosure is complex, so it may be helpful to provide an overview. This overview should not be taken as a limitation of the full scope of the invention, but a way to introduce the entire invention.

Landing & Kernel Processing

The first step in the image capture process is Landing. This is the gathering of image data from the image source. Landing image data from an image file involves understanding the image file format and extracting the data from the file and storing. This method usually occurs offline as the image file has already been collected. Therefore, the speed of capturing from an image file is not critical.

Landing from a camera occurs in real-time. For this reason, the speed of capturing and processing the image data is very important. The quicker the image is landed, the quicker the downstream processes can begin. The transport systems are typically moving an object down an image or camera track and a decision is needed before the object passes a certain point on the track.

The first of these techniques is to land the image in multiple orientations/formats. The orientations landed are normal and orthogonal. The advantage of having these orientations in separate buffers reduces the cache misses and thus provides faster memory fetches.

Another technique that is used in this system to speed up processing is to do parallel processing. This is where certain activities are occurring while still landing the image. In typical camera systems, the entire image is captured before downstream processing (framing, cropping, barcode reading, bitonal conversion, etc.) starts. In this system the downstream processing can occur in parallel while the parts of the image are being collected and landed. Specifically, framing begins on the landed image while the image is still being captured.

A third speed up technique used in landing is storing the data as a Structure of Arrays. The input data from the camera is in array-of-structures format, which is converted to structure-of-arrays while the image is landed. There are three arrays in the structure, one array for all of the pixels for each of the three color planes (one Red pixel array, one Green pixel array and one Blue pixel array) for the entire scan line. This stores each of the color data as a continuous stream of data in memory. With this setup, vector processing (also called SIMD, single instruction, multiple data) can be used on each of the color arrays since they are in contiguous memory. This provides a large speed improvement because multiple pixels can be processed on at once (based on the computers register size).

The landing is completed when a set of normal orientation, orthogonal orientation, and a grayscale image is stored in separate kernels and each kernel may contain multiple buffers for color planes. The kernel facilitates the captured data to be stored and use it for downstream processing.

Further speed increase is due to the cascading pipeline stage which is described later in this section.

Framing

Framing involves first the evaluation of edges, determining item corners, determining skew, to isolate a region of interest (ROI), a document in this case, out of the frame extent (or fully captured frame). Typically, the document is lighter than the transport belt. For online processing (real-time processing while the data is captured), as mentioned in landing, framing begins while the image is still being captured. When a certain number of scanlines has been captured, the search for the first edge of the document begins by looking for the document threshold. This threshold is established by taking the maximum luminance/brightness value measured from the track (as the camera sees the track between documents scanned), multiplying by a predetermined gain factor, and capping that enhanced luminance value at a capped luminance value (derived empirically—varies with transport) at a predetermined number.

The search for document boundaries beings from the left to right direction of the frame extent (fully captured frame), followed by right to left search. Note, that the terms left and right are used for convenience of the reader and do not require, for example, that the left be on the left side. They could just as well be side 1 and side 2. The same is true of the terms top and bottom.

Left and right are merely indication of relative opposing positions between two opposing positions and are not intended to be limiting to an absolute side or another. Top is intended to be the position first scanned by the line scanning camera, and the bottom is the opposite portion from the top.

Once the left and right-side scans for bounding points are complete, scanning of the top view for bounding points being. The scan for bottom view beings once the end of frame is signaled. The top and bottom scans are bounded by the edges established by the left and right scans, thus reducing the scan area.

Once the bounding points are established, these bounding points are converted critical points by using a cross product based on collinearity. If multiple bounding points are collinear, they are consolidated into a single critical point.

Next, two algorithms are used to generate the edges. The first algorithm is the Hough transform. The Hough transform is a feature extraction technique that can isolate the features corresponding to a specific shape in an image. In our application, the Hough transform is fed the critical points (multiple bounding points are consolidated into a single critical point) found during the boundary detection process. The algorithm uses an accumulator array, where each bin in the accumulator represents the possible lines (distance from origin, and angle) passing through a bounding point, in the Hough parameter space. At the end of the Hough transform algorithm, the bin in the accumulator with the highest value represents the most likely straight line for all of the bounding points fed into the algorithm. Once the likely line is chosen, the line is bounded by the highest bounding point and lowest bounding point for that edge view (there are four views, left, right, top or bottom).

A recursive version of the standard Hough transform is used here for better performance and resource utilization. The standard Hough transform is highly resource intensive and slow, and thus a modified version is used here for a balanced performance and resource consumption. Instead of searching a small area with stricter constraints, multiple iterations are setup so that it starts with a larger area and fewer constraints, and through the successive iterations, this search area is refined and with stricter constraints.

The second algorithm is the edge construction algorithm which also uses the consolidated critical points to reduce downstream processing loads. Once the end of frame is signaled, the edge construction algorithm begins to take in the critical points and create line segments connecting these points based on collinearity relationship. These line-segments are extended to associate neighboring line segments, the credence is higher for such points. Once this process is completed, the longest line segment is chosen to be the potential boundary edge.

The credence measure from the generated boundary edges of both algorithms are used in a Bayesian methodology to select which edges (generated from the above two algorithms) to use as the final edge. This Bayesian analysis is based on the a priori information, and thus the credence measure uses a set of decision steps or criterion (derived from empirical evidence suggested by failures found in the selection process) to arrive at the optimal final edge. The use of these two algorithms and this credence measure makes the edge or frame selection process robust.

Cascading Pipeline

When documents are captured into the system, they are landed in the kernel. The kernel represents the storage location of information collected from a document scan/capture. This kernel is handled by a control block which tracks each item in the queue and setup the required stages according to the configuration, and then feeds these into a "cascading" pipeline, which is how the image will be processed through the system. This cascading pipeline makes it possible to run multiple processing stages in parallel and significantly increase the processing speeds. In the cascading pipeline, each processing stages runs on an independent thread (which are requested from the operating system), and these threads are run in parallel.

Additional speed gains are obtained by using SIMD (single instruction, multiple data) processing (also referred to as vector processing).

Image Processing Pass Configuration

Windows are processed in "passes". A window is the user-configured view of the scanned output image. For example, a user can configure a scan output window to be 'color' and 'rotated at 90 degrees', and another window to be 'bitonal' and rotated '270 degrees'. A pass is defined as the minimum working unit for the image processing as it can be configured by the user. Passes are also the maximum configuration of a pipeline. Passes are constrained by configuration similarities. The following can be contained in one pass:

1 Color JPEG Codec per pass
    1 Grayscale JPEG Codec per pass
    Up to 3 Bitonal Codecs per pass
    1 Color Uncompressed Codec per pass
    1 Grayscale Uncompressed Codec per pass
    Multiple codecs must be the same resolution per pass
    Multiple codecs must be the same orientation per pass
    Multiple codecs must be the same deskew per pass
    Multiple codecs must be the same chroma dropout per pass For processing the various configurations listed by the user, a "pass list" is created. The pass list consists of different characteristics of a configuration that can fit inside a pass, such as scaling, rotation, color processing. Next, the windows that have common configuration options are grouped together and put into a pass. If the pass components exceed the above list, a new pass is created, and the extra windows are added onto the new pass.

The passes are processed efficiently using the cascading pipeline. Each pass indicates the maximum configuration of the cascading pipeline. For example, for a three-pass case, the cascading pipeline is run three times. The components of a pass list are the various stages in a cascading pipeline, which are run in parallel for computational speed.

For each window, line coordinates are generated for each pixel in the scan line. The line coordinates are mapped back to the frame coordinates. Scaling and rotation are used to map back to the frame coordinates to find the exact pixel location. Bilinear Interpolation is performed on the buffer generated from the line data. The memory locations of the coordinates are fed into a bilinear interpolator which outputs the corresponding scan lines. The mapped line coordinates are constrained to fit within the captured frame.

Color Dropout

The color dropout feature allows for the user to identify a set of pixels (using a color specification) and reduce or modify the color of the pixels. This is useful when the background color of the document might obscure the text. The user can enable or disable the color dropout option and can provide a 'color specification' which is used to identify the pixels for applying the color dropout. The color specification consists of a 'hue', 'saturation', and 'lightness' value. The RGB image is first converted to a HSL color space for pixel identification.

The pixels that are identified as matching to a color specification are selected for the dropout.

The image is converted to a YCC color space to perform the color dropout. The luminance (Y) channel values of these selected pixels is amplified (gain) to push the luminance values towards white (255). The color dropout consists of applying a gain or offset or clip to the luminance values of the selected set of pixels.

The chroma threshold is an available option to accommodate for the color tint that can possibly occur. The chroma is the difference between the maximum RGB value and minimum RGB value. The color dropout is currently configured to be available only in the 'bitonal' mode.

JPEG Codec

The final output image is compressed before storage, using the JPEG compression standard. The YCC image (RGB to YCC conversion using the CCIR 601 conversion process) is fed into the JPEG module where the JPEG compression is applied separately to the Y, Cb, and Cr channels.

The subsampling option can be enabled or disabled by the user. If the subsampling options is turned off, a 4:4:4 color subsampling ratio is used where the ratio indicates the proportion of the three color components (Y, Cb, Cr). A 4:2:2 ratio is used if the color subsampling option is turned on.

Color JPEG windows use all three components (Y, Cb, Cr) for the output. Grayscale JPEG windows only use the Y component for the output.

The standard JPEG codec is used which used DCT to obtain the frequency transform coefficients and these are encoded based on the level of compression selected (quality factor or Q-factor).

The various stages of JPEG codec are implemented in a faster and efficient way by the use of cas The JPEG compression is implemented for Y or luminance channel in the case of grayscale image, and separately for each of the chrominance (Cb and Cr) channels in the case of JPEG color image.

Binarization

The bitonal conversion or binarization module converts a grayscale image (obtained from the 24-bit color raw image) into a binary image with two values (0s and 1s). The objective is to pass the raw image through a decision-making process, where each pixel is decided whether to be a foreground or background. The foreground or background definition can vary depending on the application, but in this case, the text is considered as foreground, and the texture is the background. In a practical sense, any information in the document that may be desired to be retained is the foreground, and any information that is deemed to be discarded is the background. The two key processes involved in this binarization application are the estimation of a background threshold, and an edge threshold. The background threshold is used to remove any non-text and other non-desired information from the document, while the edge threshold enhances the edge and make them sharp, thus enhancing the visual quality of the image.

The background threshold is based on the image histogram and entropy analysis. The first, second, and third derivatives of the entropy are also used to estimate the tonal groups (or the collection of luminance values of certain range) within the image. The conventional entropy analysis estimates the threshold based on entropy peaks which suits best for bimodal distribution images (with two tonal groups). A modified and improved version of entropy analysis is used in our application, where first the entropy derivatives are used to estimate the zero-crossings of the tonal groups. This information is used along with some decision steps and prior information to advance or retreat from the threshold, that is calculated based on entropy peaks.

The edge threshold for edge enhancement uses a gradient analysis to detect the edges first, using Laplace transform. These edges are processed using entropy analysis and first derivate of entropy to estimate a positive and negative edge on both sides of the entropy distribution. The estimated threshold is constrained by the cumulative distribution function (CDF) to prevent the threshold being below or above a certain predetermined CDF percentile range.

The threshold estimation also makes use of the cascading pipeline and landing speeds ups for increasing the algorithm speed and efficiency.

The following is a summary of some of the aspects of the disclosure. The details of these aspects and other are also found in the Detailed Description portion of this document:

There is disclosed a method of increasing the throughput of a document scanner having a feeder, a camera capable of scanning an image and generating a digital output, a document transfer device for moving a document across the camera, a processor for receiving the digital output from the camera, the processing of the digital output comprising any or all of the steps of:

Landing—Storing the digital image data from camera inputs into a Kernel—Each camera captures a different image, which is landed into its own Kernel. Details in this section are relative to a single camera, image, and kernel.

i. Delivering a document for scanning into a scanning station having a camera which scans a plurality of sequential scan lines, a camera track, said camera providing an electrical signal corresponding to image data of the document;

ii. Moving the document on the camera track at a predetermined speed across the scan line landing the image data comprising the steps of:

1. Storing the image data in a first format which is comprised of three normal orientation arrays or buffers with each containing data for the respective red, blue, or green color channels that represent the image;
2. Storing the image data in a second format which is comprised of three arrays with an orthogonal orientation, at right angles to the normal orientation arrays where each array represents a red, blue, or green color channel;
3. Storing the image data in a third format which is comprised of a grayscale array in a normal orientation;
4. Processing the image data of said first, second and third formats in parallel with each other— NOTE: Storing the 7 buffers described above allows for parallel processing later, but no parallel processing on these buffers is done as part of the landing process.
5. Storing said arrays or buffers in contiguous memory; and
6. Storing said arrays in a single object that is a repository for all digital data about a given image, called a Kernel; (during image processing this "kernel" also stores the framing data such as image histogram in the succeeding "framing" stage).

b. Framing—Identifying a region of interest that isolates document from track (which is used for cropping and de-skewing operations during Image Processing)
1. Establishing a track luminance value that can be used as a threshold (track luminance threshold) to distinguish camera track background and document in a captured image
   a. This is done by using the camera to record the average luminance value of the track whenever a document is not in front of the camera.
   b. Note: Historically, we used a different method to establish this threshold involving statistical analysis (relative entropy and cumulative distribution functions) of a greyscale image histogram, but this method is no longer used during scanning operations.
2. A captured image is searched through line by line four different times, each time from a different projected viewpoint (left to right, right to left, top to bottom, and bottom to top) with the goal of estimating a line that represents the edge of the document relative to that projected viewpoint having g:
   a. Bounding Points—Search through each line in in a scanned image from the projected viewpoint (Left to Right for the Left View, Right to Left for the Right View, Top to Bottom for the Top View, and Bottom to Top for the Bottom View) and Identify points of transition from background to foreground known as bounding points by the following method:
      i. As a line is being iterated, the first pixel encountered that is above the track luminance threshold becomes a bounding point candidate
      ii. If further iteration reveals that a predetermined number of pixels are also above the threshold, iteration for that line stops and the candidate is recorded as the bounding point for that line, it is added to the bounding point collection for the projected view, and iteration for the next line begins.
      iii. If the entire line is iterated and there are not enough contiguous pixels to qualify as a bounding point, no bounding point is identified for the line and added to the bounding point collection, and the iteration for the next line begins.
   iv.
   b. Critical Points—For the given view, consolidate Bounding Points into a smaller collection of points, known as Critical Points
      i. Critical points represent collinear collections of bounding points
      ii. Critical points are assigned a weight value, where weight is the number of bounding points that have been consolidated into the point
      iii. Collinearity of bounding points is established by iterating through a projected view's numerous collection of Bounding Points sequentially and performing a trigonometric operation comprising:
         1. As bounding points are iterated, the first Bounding Point encountered initializes a Critical Point, and the Critical Point is given the same coordinates of this first bounding point
         2. As the sequential iteration continues the next point is used to define a temporary line segment with the first point, and is also consolidated into the Critical point by incrementing the Critical point's weight by one
         3. Subsequent points beyond the first two will be tested for collinearity as described in step 4 below until either one of two criteria are met, in which case a new Critical Point is created as the process starts over at step 1 above:
            a. A Bounding point fails the collinearity test—this Bounding point that is not collinear will become the "first" bounding point encountered as step 1 repeats for a new Critical point.
            b. A predetermined number of bounding points have been determined to be collinear with the given Critical Point and its weight exceeds the predetermined threshold. The first collinear bounding point that exceeds this threshold will become the "first" bounding point encountered as step 1 repeats for a new Critical point.
         4. A bounding point is tested for collinearity using a trigonometric operation known as the vector cross product, which accepts two line segments or vectors as its input and returns a value that represents the area of a parallelogram that the input vectors span—collinearity can be inferred by comparing said area to a predetermined threshold.
         The term cross product is a term known in mathematics, This site provides further information which is incorporated herewith: https://en.wikipedia.org/wiki/Cross product:
            a. The line between the first two Bounding Points is treated as one vector, and another line is created between the Bounding Point being tested and one of the first two Bounding Points. The cross product is applied to these two vectors.
            b. The results of a cross product operation is another vector with a magnitude and direction. The magnitude of that resulting represents the area of a parallelogram formed by those vectors, if that area is lower than a predetermined threshold, then we can consider the two vectors to be collinear, and therefore the tested point will be considered collinear.

c. If the tested Bounding Point is considered to be collinear, the weight of the Critical Point will be incremented by one and the tested Bounding Point will not be used further.

c. Frame Extent
  i. A line is defined that is collinear with the edge of full captured image before any framing is applied. This line is known as the full frame extent for that projected view (after all four views have been searched, there will be four full frame extent lines that form a rectangle exactly the size of the fully captured frame).
  ii. This full frame extent is translated/shifted away from the full captured image edge towards the opposite side of the captured image (for the Left projected viewpoint, this will be a translation from left to right) until it touches any critical point. This translated line is known as the translated frame extent.

d. Edge Line (boundary) Candidate Generation
  i. Critical Points for a given view are input into two different algorithms that each return a line definition, with each line having a confidence value associated with it, known as the line's credence
  ii. A credence value is the ratio between the number of Bounding Points (weights of Critical Points) that fall along the line and the total number of Bounding points for the given view.
  iii. After both algorithms have returned line definitions, a decision will be made to choose between them.
  iv. Recursive Hough Transform Algorithm (HT)
    1. All of the critical points for a given view are passed through multiple iterations of the Hough Transform feature extraction technique
    2. The Hough Transform involves a voting process for each input Critical Point that can be constrained a by a reference line and an angle to that reference line, and results in an estimated line definition for all of the critical points that fall within that constraint.
    3. The first iteration uses the full frame extent for the given view for the reference line and a predetermined angle to that full frame extent as the initial Hough Transform constraints
    4. Subsequent iterations use the results of the previous iteration as a reference line, and the angle gets progressively narrower through each iteration by a predetermined amount.
    5. Progressive constraints in each iteration minimize system resource consumption and improve accuracy of the Hough Transform's line estimation.
    6. After a predetermined number of iterations or when no significant change in results is observed between iterations, line definition from the last iteration is chosen as the Edge definition for the Recursive Hough Transform Algorithm
  v. Edge construction Algorithm (EC) (alternate algorithm)
    1. Note: The edge construction algorithm functions very similarly to the Critical Point consolidation process, except there is no weight limit in the Edge construction process.
    2. Critical Points are, for a given view, iterated through, and collinear Critical points are assigned to line segments.
    3. Collinearity is determined using a vector cross product and a predetermined area threshold
      a. The predetermined area threshold is scaled by normalization to the length of the line segment it is being tested against.
    4. Once all Critical Points have been iterated through for a given view, the longest line segment, which is generally the line with the highest credence, becomes the chosen line definition for the Edge Construction algorithm.
    5. The points for the chosen line segment are passed through the Recursive Hough Transform algorithm process to establish an angle between the line and the full frame extent for the given view, which can later be used to establish skew angle.

e. Edge Line Decision
  i. A decision is made to use the edge definition obtained from the Edge Construction algorithm, the edge definition obtained from the Recursive Hough Transform algorithm, or to use the results of neither algorithm and fallback to the translated frame extent as the ROI edge for the given view.
    1. The decision is based on a set of criteria established by empirical observation (ie creating a predetermined number which is derived from manual testing), outlined as follows:
      a. If the HT edge has a credence significantly higher than the EC edge, as defined by a predetermined threshold, and the EC edge is above a certain floor threshold, select the HT edge.
      b. If the HT edge credence is above a relatively high predetermined value, select the HT edge.
      c. If the EC edge credence and HT edge credence both fall below predetermined thresholds, then discard both HT and EC edges and fall back to using the translated frame extent and defaults a low credence to the final edge.
      d. If none of the other criteria apply, select the EC edge;

f. Translation—A selected edge will be shifted or translated along a line perpendicular to the full frame extent for that view. Note: This process actually happens independently for each edge before the selection process, but is not essential to the selection process.
  i. If the selected edge definition came from the EC or HT algorithms, it will be shifted or translated outwards (from right to left in the case of the Left View) until it reaches a point that no critical points remain outside its boundary
  ii. If the selected edge was based on the full frame extent, it will start at the full frame extent and be translated inwards (from left to right in the case of the Left View) until any point along the line touches a critical point.

iii. This translation step ensures that no document data is lost in any cropping processes down the line, but that no extraneous portions of the image are included.
3. After the four edge definitions have been established, their four intersecting points of those lines can be used in the next processing stages, which involve cropping and de-skew operations.

c. Image Processing—These are provided in summary form since a person skilled in the art will know portions not found her.
  i. Coordinate Generation—Cropping, Scaling, and Orientation are applied here.
    1. The Generate stage generates the coordinates for the output based on the pass configuration. UOWs are initialized with the coordinates and passed through to the next stage; one UOW for each line in the output. Here, if there are no free UOWS the stage will pause up to 20 ms waiting for a free UOW—if that time expires, an error "Work Initialize Timeout" is thrown and the system will go into shutdown; additionally, if the last line, EOF, is not completed within a specific time (determined by the total number of pixels to be processed), an error "Push Image Timeout" is thrown and the system will go into shutdown. The coordinates are simply column (x) and row (y) values. The values are ascending for 0 and 90 degree orientations while they are descending for 180 and 270 degree orientations. Column coordinates span the width of the image for normal (0 and 180 degrees) orientations) and the height for orthogonal orientations (90 and 270 degrees); likewise, for row coordinates. The coordinate data is single precision floating point format (4 bytes per value). All coordinates are then scaled by single precision floating point multiply as indicated by scaling configuration of the pass, adjusting the resolution of the output.
  ii. Rotation—Deskew
    1. The Rotate stage rotates the coordinates (about the center of the window) for deskew if deskew is specified by the pass configuration; if not, the rotate angle is 0 degrees.
  iii. Mod F
    1. The Mod F stage extracts the integer and fractional part from the coordinates. The integer parts are stored (in the UOW) for later use while the fractional parts are used to develop bilinear coefficients (4 for each pixel location) which are stored (in the UOW) for later use.
  iv. Indexing
    1. The Index stage converts the two-dimensional image coordinates extracted in Mod F to a one-dimensional index. Two indexes are created, one for each row of the bilinear conversion matrix, and stored (in the UOW) as 4 byte integers for later use. Additionally, indexes are constrained to the frame image bounds—indexes outside of said bounds point to reference position where the default pixel value (zero) is stored. All of this is done because two-dimensional access requires a multiplication and addition for every byte read; we will read four bytes from three color planes, so this eliminates 24 operations per pixel.
  v. Kernel Read
    1. The Kernel Read stage made up of is three stages in sequence where each stage is assigned for reading from its particular kernel color plane using the indexes created in the previous (Index) stage. Four bytes, surrounding the pixel location output from the rotate stage are read and stored (in the UOW) for later use; for a total of 12 reads per pixel
  vi. Bilinear Interpolation
    1. The Interpolate stage performs interpolation for each of the color components using coefficients derived in Mod F and image data from Kernel Read. Results are stored in the UOW. At this point we have actual image data, where before we were working with coordinates and raw data. The image lines are now scaled, oriented, and deskewed with one line buffer each for Red, Green, and Blue color components.
  vii. Ycc conversion
    1. Convert RGB format image data to YCrCb format image data—Y is grey scale Cb and Cr are color channels
    2. This is conversion separate from any greyscale conversion done in the framing process.
  viii. Produce image gradient data
    1. This stage calculates the derivative of the luminance channel(s) in normal and orthogonal directions for utilization by the Bitonal Codec(s). This stage is independent of the bitonal stage so that multiple Bitonal Codecs (when on the same pass) utilize the data generated only one time.
    2. Generate a value for each pixel in the horizontal (x) direction
      a. For each line in the image, and for each pixel in the line, ignoring the first and last pixel of the line, calculate the value for the pixel with v=pixel[x+1]−pixel[x−1]
    3. Generate a value for each pixel in the vertical (y) direction
      a. For each column of pixels in the image, and for each pixel in the column, ignoring the first and last pixel of the column, calculate the value for the pixel with v=pixel[y+1]−pixel[y−1]
    4. Generate a histogram from the values to be used later for bitonal output
  ix. Color Dropout (Can be applied to any output, but preferably only exposed for Bitonal outputs) This is the process of removing the effects of a background color(s) in a document so that the desired data can more easily to identified.
    1. Summary
      a. Color Dropout is the process of altering targeted color(s) in an image, forcing saturation (push towards max) of targeted pixels. The motive is to reduce the effects of targeted colors on bitonal outputs, making the targeted colors appear as background—being excluded from the bitonal output. We do this by generating a mask of matched colors and choosing a gained Luminance (rather than unprocessed Luminance) [what is the difference between the two] for pixels associated with the mask, where the gain characteristics are specified by the user. Generation of the mask is a multistage process which utilizes the HSL color space for matching user specified colors and requires calculating Chroma (colorfulness of the pixel), Hue, Saturation and Lightness HSL. The gain is applied after the YCbCr conversion stage, creating two Luminance buffers allowing both Dropout and Non-Dropout outputs to run on the same pass. Color Dropout is not intended for color or grey scale outputs and is only available as a diagnostic output for those outputs.

2. Workflow
   a. RGB to HSL Conversion
      i. When color dropout is enabled a new stage is inserted into the pipeline between the Bilinear Interpolation and YCC Conversion stages
      ii. This stage is responsible for converting the RGB color space data for the image to Hue-Saturation-Lightness (HSL) color space data, which is then stored in the kernel for later use in the color dropout stage.
   b. Mask Generation
      i. A mask array the same size as the image data is generated by iterating through The HSL image data and identifying any pixels that fall within a range of user configured color specifications and marking the corresponding pixel in the mask array.
      ii. Each pixel in the mask array corresponds to a pixel in the source image, where pixels in the mask can have one of two values that represent actions:
         1. Do not modify the corresponding pixel in the source image
         2. Modify the corresponding pixel in the source image
   c. Mask Application
      i. The Y (greyscale/luminance) channel of the source image is iterated through, and wherever a corresponding mask pixel has a value which represents that the source image should be modified, a user specified gain factor is applied to the luminance value in the source image. This will lighten or brighten the pixel in the greyscale image, ensuring that it will later become foreground or background in a binarized image, as desired by the user configuration.
      ii. The mask is only applied to one of two duplicate Y-channel buffers, so that the system can be configured to output both images with and without the gain factor applied and not require multiple passes through the pipeline.

x. Brighten (Optional)
   1. Image Brighten is the process of saturating the brightness of the image. The motive is to reduce texture in the background, where the background is considered to be the brightest parts of the image. We do this by amplifying the Luminance channel of the entire image such that all the bright parts are saturated to a user defined target. As part of landing a luminance histogram for the ROI is developed. The user specifies a percentile and a threshold to define the gain parameters. The Cumulative Distribution (CDF) of pixels brighter than the threshold is utilized to derive the histogram bin associated with the specified percentile. The gain is the ratio of the specified target and the percentile target found; unity gain is used if no pixels were found above the specified threshold. The gain is applied after YCbCr conversion stage. Image Brighten affects all outputs for the pass—so outputs without Image Brighten will not run on the same pass as outputs with Image Brighten.

xi. Whiten (Optional)
   1. Image Whiten is the process of altering the tint of an image. The motive is to reduce color in the background, where the background is considered to be the brightest parts of the image. We do this by amplifying the Color channels of the entire image such that the brightest parts color will approach zero (grey). As part of landing color (Cb, Cr) histograms for the ROI is developed. The user specifies a percentile and a threshold to define the gain parameters [these are the same values as used by Image Brighten]. The Cumulative Distribution (CDF) of pixels brighter than the threshold is utilized to derive the histogram bin associated with the specified percentile for each color. The gain is the ratio of 1 and the percentile target found; unity gain is used if no pixels were found above the specified threshold. Be aware that the color components are represented as a signed value where zero is no color while higher absolute values represent the color; so, unlike Image Brighten, Image Whiten is pushing values towards zero. Notably, all tint may not be removed as saturation (clamping to zero) is not used when applying the gain [opportunity for improvement], allowing some values to overshoot slightly. The gains are applied after YCbCr conversion stage. Image Whiten affects all outputs for the pass—so outputs without Image Whiten will not run on the same pass as outputs with Image Whiten [opportunity for improvement, as grey and bitonal images do not use color information].

xii. JPEG Color (Optional Output)—Output color image according to standard JPEG compression
   1. Made up of three separate pipeline of processing stages—one for each component (Y-Greyscale, Cb—Color, Cr—Color) channel of the image.
   2. Different functions of the JPEG standard are applied to processing stages of the pipeline:
      a. Setup minimal coding units (MCU) according to JPEG standard
      b. Apply color subsampling according to JPEG standard
      c. Apply 2D Discrete Cosign Transform (DCT) according to JPEG standard, divided into three sub-stages:
         i. DCT Row
         ii. DCT Column
         iii. Calculate DCT Coefficients
      d. Apply Entropy Encoding according to the JPEG standard
      e. Emit stream output containing image data.

xiii. JPEG Greyscale (Optional Output)—Output greyscale image according to standard JPEG compression
   1. Made up of a single pipeline of processing stages for the greyscale component of the image
   2. Different functions of the JPEG standard are applied to processing stages of the pipeline:

a. Setup minimal coding units (MCU) according to JPEG standard
b. Apply color subsampling according to JPEG standard
c. Apply 2D Discrete Cosign Transform (DCT) according to JPEG standard, divided into three sub-stages:
i. DCT Row
ii. DCT Column
iii. Calculate DCT Coefficients
d. Apply Entropy Encoding according to the JPEG standard
e. Emit stream output containing image data.
xiv. Bitonal (Optional Output)—Output a binarized image by converting the greyscale image data into bitonal image data
1. Enhance Edges
  a. Establish Edge Enhancement Thresholds—
  i. The histogram data from the "Produce image gradient data" step is used to generate an entropy curve aligned to the histogram where points along the x axis of the curve correspond to bins in the histogram.
  Definition of entropy from Wikipedia, for reference: "The information entropy, often just entropy, is a basic quantity in information theory associated to any random variable, which can be interpreted as the average level of "information", "surprise", or "uncertainty" inherent in the variable's possible outcomes." https://en.wikipedia.org/wiki/Entropy (information_theory)#:~:text=The%20self%2Dinformation%20quantifies%20the, on%20all%20its%20possible%20outcomes.
  ii. Features, such as peaks, valleys, shelves, and zero-crossings, of the entropy curve and the entropy curve's derivatives have been identified through empirical observation to mark effective bins in the corresponding histogram whose indexes represent ideal threshold values to be used later edge enhancement processes.
  iii. Analysis is focused on locating a predetermined feature of the entropy curve and selecting the corresponding histogram bin, then advancing or retreating the index for the selected bin (moving left or right along the x-axis) based on the existence of other nearby features.
  iv. After all known features have been accounted for, the index of the selected histogram bin, which represents a rate of change, is chosen as a threshold.
  v. This feature analyzation process is applied twice, once to determine a threshold value representing positive rates of change, and another that represents negative rates of change.
  vi. The Adaptive Threshold process accepts an additional input parameter that modifies the chosen thresholds by a specified percentage.
  b. Generate Edge enhancement Masks
  i. Two image masks are generated that each represent pixels marked for modification during the final edge enhancement application—One for transitions beyond the edge enhancement threshold in the x direction and one for transitions in the y direction.
  1. Masks are generated by iterating through gradient image data for a given direction (x or y) and identifying areas beyond a certain threshold. The two different thresholds established earlier (referred to as positive and negative thresholds) are used—one to identify rapid changes from background to foreground, and the other to identify rapid changes from background to foreground.
  a. Each pixel in an image mask corresponds to a pixel in the source image. A mask pixel can have one of three different values, each representing which function should be performed on the source image when the mask is applied:
  i. No change
  ii. Enhance pixel to foreground luminance
  iii. Enhance pixel to background luminance
  c. Apply Edge Enhancement Masks—
  i. The source image is iterated through and the luminance for each pixel is modified according to the value of the corresponding pixel in the generated masks.
  1. Pixels that have been marked in the mask for foreground enhancement will be modified to a minimum (dark) luminance value while pixels that have been marked in the mask for background enhancement will be modified to a maximum (light) luminance value. Performing this step before the application of the background threshold ensures that the modified pixels will become either foreground or background in the resulting bitonal image, regardless of what the background threshold is set to.
2. Background Thresholding
  a. Establish Background Threshold—
  i. The luminance values for each pixel in the greyscale image to be converted are accumulated into a single histogram
  ii. The luminance histogram data is used to generate an entropy curve aligned to the histogram where points along the x axis of the curve correspond to bins in the histogram.
  Definition of entropy from Wikipedia, for reference: "The information entropy, often just entropy, is a basic quantity in information theory associated to any random variable, which can be interpreted as the average level of "information", "surprise", or "uncertainty" inherent in the variable's possible outcomes." https://en.wikipedia.org/wiki/Entropy (information theory)#:~:text=The%20self%2Dinformation%20quantifies%20the, on%20all%20its%20possible%20outcomes.
  iii. Features, such as peaks, valleys, shelves, and zero-crossings, of the entropy curve and the entropy curve's derivatives have been identified through empirical observation to mark effective bins in the corresponding histogram that contain ideal threshold values to be used later in the thresholding process.
  iv. Analysis is focused on locating a predetermined feature of the entropy curve and selecting the corresponding histogram bin, then advancing or retreating the index for the selected bin (moving left or right along the x-axis) based on the existence of other nearby features.

v. After all known features have been accounted for, the index for the selected histogram bin, which represents a luminous level, is chosen as a threshold.

vi. The Adaptive Threshold process accepts an additional input parameter that modifies the chosen threshold by a specified percentage.

b. Apply Background Threshold i. The source image is iterated through and any pixel that has a luminance value that is above the specified background luminance threshold will be assigned a predetermined binary value representing that it is foreground data, while any pixel with a luminance value below the threshold will receive a predetermined binary value representing that is background data.

3. De-speckle a. Summary—Speckles are undesired artifacts that may appear as part of the bitonal conversion. Speckles typically occur due to edge enhancement in the background where texture changes may be enhanced; additionally, speckles are intentionally incorporated in some documents as a security feature. We implement a method for dark speckle removal based on filtering the output from a modified connected segments algorithm; accomplished in three stages of the bitonal codec operating on each UOW (bitonal scan line). The first stage forms "modules" of connected dark pixels within each scanline. The second stage connects (using 8 way connectivity) modules on the previous scan line to modules on the current scan line forming "connected segments". The third stage observes the mass (collected sum of dark pixels), and the diagonal (of encompassing rectangle) of each connected segment; whitening objects that are found to be under threshold criteria where the criteria are formed by speckle size specified in 100ths of an inch (up to 5 100ths of an inch).

4. Output a. Adjust bit pattern to associate background with a binary value of 0 and foreground with a binary value of 1.

b. Bitonal compression is applied using CCIT Group 4 compression standard xv. Uncompressed Color (Optional Output) (No claims, may want to remove UC codecs from this outline)

xvi. Uncompressed Grey (Optional Output) (No claims, may want to remove UC codecs from this outline)

xvii. JPEG 2000 (Optional Output)—Color—Compress and encode color image data according to JPEG2000 standard. Color implementation utilizes reversible color difference conversion 1. Image Tiling a. Tiles are serialized on independent stage i. Serialization of code-block streams to output ii. Serialized by Resolution Level and Component 1. Precincts and bands are not utilized (only one each per component)

iii. Tiles are sections of image iv. Tiles are divided by component each with independent pipeline 1. Tiles must have even value for width and height a. Image will be truncated by 1 pixel width/height if odd values requested 2. Tile Components a. Perform Discrete Wavelet Transform (DWT)

i. Multiple stages required—one for each resolution level b. Compress and Emit results by code-blocks i. Organized by resolution level ii. Multiple stages—one for each bit of resolution in DWT output iii. Code=blocks provide temporary streams to be utilized by tile serialization xviii. JPEG 2000 (Optional Output)—Grey—Compress and encode greyscale image data according to JPEG2000 standard—Greyscale implementation omits format conversion 1. Image Tiling a. Tiles are serialized on independent stage i. Serialization of code-block streams to output ii. Serialized by Resolution Level and Component 1. Precincts and bands are not utilized (only one each per component)

iii. Tiles are sections of image iv. Tiles are divided by component each with independent pipeline 1. Tiles must have even value for width and height a. Image will be truncated by 1 pixel width/height if odd values requested 2. Tile Components a. Perform Discrete Wavelet Transform (DWT)

i. Multiple stages required—one for each resolution level b. Compress and Emit results by code-blocks i. Organized by resolution level ii. Multiple stages—one for each bit of resolution in DWT output iii. Code=blocks provide temporary streams to be utilized by tile serialization 3. Gather Data 4. Apply JPEG 2000 Standard to encode/compress image data 5. Output Other aspects of the disclosure include the following:

A method of high throughput sheet scanning and processing digital images at high speed, comprising any or all of the following in any order:

connecting a host PC signally with a line scanning camera with a field of view on a document track carrying documents through the field of view in a direction perpendicular to a width of the field of view;

recording image data from the field of view of the line scanning camera as a plurality of sequential scan lines;

illuminating the field of view with a light source;

delivering the document on the document track at a predetermined speed.

Also disclosed is detecting a leading edge of one of the document using an array of optical sensors monitoring a document track location upstream from the field of view; triggering a start of frame signal to the line scanning camera once at least one of the optical sensors detects the one of the documents;

triggering an end of frame signal to the line scanning camera once all the optical sensors no longer detect the one of the documents;

assigning a set of the image data recorded between the start of frame signal and the end of frame signal to be a full frame of image data;

landing the image data of the one of the document by storing the full frame of image data into a memory of the host PC of the host PC;

framing the full frame of image data as a plurality of sequential scan lines to identify a region of interest corresponding to the one of the document within the full frame of image data; and processing the region of interest image data as a plurality of Units of Work that corresponding to a plurality of passes through a plurality of stages within a pipeline, Also disclosed is landing the image data of the document, comprises:

marking a first scan line corresponding to the start of frame signal;

marking a second scan line corresponding to a predetermined offset from the end of frame signal;

marking a set of sequential scan lines between the first scan line and the second scan line to be a full frame of image data of the one of the document;

storing the full frame of image data in the memory of the host PC in a normal format and an orthogonal format that each includes three arrays or buffers containing an RGB format image data.

Also disclosed is creating a grayscale array from the normal format and storing the grayscale array as a grayscale normal format in the memory of the host PC.

Also disclosed is storing each of the three arrays of the normal format, the three arrays of the orthogonal format, and the grayscale array respectively in a contiguous memory address of the memory of the host PC.

Also disclosed is framing the full frame of image data, comprising:

identifying bounding points using a luminance threshold;

consolidating collinear bounding points into critical points and respectively assigning said critical points numerical weights;

calculating a first set of region of interest edges using the Edge Construction Algorithm;

calculating a second set of region of interest edges using the Recursive Hough Transform Algorithm;

calculating credence of the first and the second sets of region of interest edges;

selecting a final set of region of interest edges using the credence.

Also disclosed is storing a framing data that identify a position of the region of interest data in the memory of the host PC with the three arrays of the normal format, the three arrays of the orthogonal format, and the grayscale array.

Also disclosed is identifying bounding points using a luminance threshold, comprises:

calculating an average luminance value of the document track by averaging a luminance value captured by the line scanning camera when the array of optical sensors identifies no documents in the field of view of the line scanning camera;

multiplying the average luminance value by a predetermined gain factor to establish a threshold luminance value of documents;

de-intifying the bounding points of left projection using the grayscale array by searching for data point from left to right of the full frame of image data where the luminance value changes from below the threshold luminance value to above the threshold luminance value for a first time and stays above the threshold luminance value for a predetermined number of image data points.

Also disclosed is a method of identifying the bounding points of right projection using the grayscale array by searching for data point from right to left of the full frame of image data where the luminance value changes from below the threshold luminance value to above the threshold luminance value for a first time and stays above the threshold luminance value for a predetermined number of image data points.

Also disclosed is identifying the bounding point of the top projection using the grayscale array, after the searching for the bounding points of the left projection and right projection have been completed, by searching for data point from top to bottom of the full frame of image data, but only in-between the identified bounding points of the left and right projections, where the luminance value changes from below the threshold luminance value to above the threshold luminance value for a first time and stays above the threshold luminance value for a predetermined number of image data points.

Also disclosed is identifying the bounding point of the bottom projection using the grayscale array, after the end of frame signal and after the searching for the bounding points of the left projection and right projection have been completed, by searching for data point from bottom to top of the full frame of image data, but only in-between the identified bounding points of the left and right projections, where the luminance value changes from below the threshold luminance value to above the threshold luminance value for a first time and stays above the threshold luminance value for a predetermined number of image data points.

Also disclosed is terminating the searching within the line of image data once a bounding point for the line is identified.

Also disclosed is consolidating collinear bounding points into critical points with weights, comprises:

consolidating collinear bounding points the left projection using cross product and sequentially following a direction orthogonal to the projection, consolidating collinear bounding points of the right projection using cross product and sequentially following a direction orthogonal to the projection, consolidating collinear bounding points of the top projection using cross product and sequentially following a direction orthogonal to the projection, consolidating collinear bounding points of the bottom projection using cross product and sequentially following a direction orthogonal to the projection, assigning weight to each of the critical points to be the number of bounding point consolidated into the critical point following a direction orthogonal to the projection. Also disclosed is calculating credence, as a ratio between a number for the bounding points on a ROI edge and a total number of the bounding points of the corresponding projection, for:

a left ROI edge calculated from the Recursive Hough Transform Algorithm a right ROI edge calculated from the Recursive Hough Transform Algorithm a top ROI edge calculated from the Recursive Hough Transform Algorithm a bottom ROI edge calculated from the Recursive Hough Transform Algorithm a left ROI edge calculated from the Edge Construction Algorithm a right ROI edge calculated from the Edge Construction Algorithm
a top ROI edge calculated from the Edge Construction Algorithm
a bottom ROI edge calculated from the Edge Construction Algorithm.

Also disclosed is selecting a set of final region of interest edge from one of the left ROI edge from the recursive Hough Transform Algorithm or the Edge Construction Algorithm, from one of the right ROI edge from the recursive Hough Transform Algorithm or the Edge Construction Algorithm, from one of the top ROI edge from the recursive Hough Transform Algorithm or the Edge Construction Algorithm,
and from one of the bottom ROI edge from the Recursive Hough Transform Algorithm or the Edge Construction Algorithm, comprises:
selecting a ROI edge calculated from the Recursive Hough Transform Algorithm if the ROI edged from the recursive Hough Transform Algorithm having a credence between a predetermined credence threshold and a higher predetermined credence threshold for Hough Transform and the corresponding ROI edged from the Edge Construction Algorithm having a credence below a predetermined credence threshold for Edge Construction,
selecting a ROI edge calculated from the recursive Hough Transform Algorithm if the ROI edged from the recursive Hough Transform Algorithm having a credence equal or above a higher predetermined credence threshold for Hough Transform,
selecting a corresponding frame extent edge as a projection if a ROI edged from the recursive Hough Transform Algorithm having a credence below a predetermined credence threshold for Hough Transform and the corresponding ROI edged from the Edge Construction Algorithm having a credence below a predetermined credence threshold for Edge Construction,
selecting a ROI edge calculated from Edge Construction if otherwise.

Also disclosed is framing further comprising:
shifting the selected ROI edges away from a center of the full frame of image data and perpendicular to the ROI edge until a predetermined portion of bounding points are inside the region of interest if the selected ROI edges are selected from the ROI edges calculated from Recursive Hough Algorithm or the Edge Construction Algorithm;
shifting the selected ROI edges towards the center of the full frame of image data and perpendicular to the ROI edge until the edge becomes tangential with one or more bounding points if the ROI edges are selected from the frame extent edges; and storing a framing data according to coordinate of the shifted ROI edges in the memory of the host PC.

Also disclosed is storing landed image data in a circular buffer comprises a predetermined number of kernels holding image data of documents;
wherein each kernel comprises image data associated with a single document, and each kernel comprises:
landed color buffers in normal and orthogonal direction, grayscale buffer in normal direction, and framing data.

Also disclosed is the kernels are added onto the circular buffers when new documents are landing.

Also disclosed is kernels are removed when the image data is completed kernel is processed.

Also disclosed is an error message is generated when more than the predetermined number kernels are added onto the circular buffer.

Also disclosed is subdividing image data into a plurality of UOWs according to substituent stages;
redistributing the image data into a different plurality of UOWs according to different stages. Also disclosed is establishing a UOW pool having a predetermined number of uninitialized UOW objects in the UOW pool so that only a limited number of UOWs can be entered into a pipeline at a given time avoiding pipeline overload 1;
initializing UOW objects by assigning data sets into the UOW objects according to the respective stage and creating initialized UOW loaded with the data sets,
wherein data sets comprise image data, framing data, or the image data and the framing data;
returning UOW object to the UOW pool after the respective stage is completed so that the UOW objects can be initialized again to process image data;
wherein UOW is loaded with data sets configured according to the stage processing the UOW, wherein data sets comprise: image data, framing data, or the image data and the framing data.

Also disclosed is in a pre-codec image processing sub-pipeline, UOWs are loaded with single line of grayscale pixels of the image data prior to entering a DX stage;
wherein, the DX stage converts the image data into gradient image data and stores the gradient image data in a same kernel with the grayscale image data.

Also disclosed is a stage comprises a set of CPU instructions specific to the stage wherein the stage comprises:
an input queue positioning UOWs sequentially and having a number of positions larger than a total number of initialized and uninitialized UOW in the UOW pool;
a processing function operates on the UOWs sequentially as arranged by the input queue;
an output function feeding the output to the next stage or the kernel;
wherein a stage in a first position of a pipeline initializes UOW objects with image data.

Also disclosed is a stage in a last position of a pipeline release UOW objects to the UOW pool.

Also disclosed is allocating each of the stages a unique processing thread managed by the operating system of the host PC so that a plurality of UOW are operated in parallel.

Also disclosed is the pipeline comprising a plurality of stages sequentially connected in series wherein image data configured in UOWs cascading through a first stage and to a last stage according to a configuration of the pipeline;
wherein stages in a pipeline are structured with abstract inputs and outputs respectively so that one or more of the stages can be added, inserted, and removed according to user configurations and without reconfiguring the rest of stages.

Also disclosed is wherein the pipeline comprises, sequentially: a landing and framing sub-pipeline, a pre-codec processing sub-pipeline, and a codec processing sub-pipeline each managed respectively by Process controllers.

Also disclosed is the pipeline is further associated with a management object.

Also disclosed is the management object comprises a control object managing a Landing and Framing Process controller and an Image Processing Process controller that synchronize interactions between the landing and framing sub-pipeline, the pre-codec processing sub-pipeline, and codec processing sub-pipeline.

Also disclosed is the management object further comprises an error generator through a callback process.

Also disclosed is the management object further comprises an output manager that directs completed filed to be saved at location according to user configurations through a callback process.

Also disclosed is the framing and landing pipeline control tread manages the receiving of packets of data from a camera interface device, the identification of the start of frame signals and the end of frame signals, the initializations of UOW from the packets of data, and the conduction of the initialized UOWs to the first stage of the framing and landing sub-pipeline.

Also disclosed is the Processing Process controller generates a list of passes according to the user's image output configurations, Also disclosed is a pass comprises a collection of stages that has been configured to accomplish a set of user output configurations and translating framing data into output coordinate data according to requirements of the pass.

Also disclosed is each pass of the list of passes comprises:
an assemble sequence of stages according to a pass configuration;
a hands-off configuration to initialize UOWs for a stage of a pipeline or sub-pipeline; and
a controller to hand off the pass configuration for a next item within the pipeline or sub-pipeline after receiving a complete signal that communicates all UOWs have been processed through the pass.

Also disclosed is the image processing thread further attaches a first stage of the codec processing sub-pipeline with the last stage of the pre-codec processing sub-pipeline.

Also disclosed is a method of de-speckle comprising;
assembling connected dark pixels within each scanline into modules;
connecting adjacent modules on a previous scan line to modules on the current scan line forming connected segments;
calculating a mass and a diagonal (of encompassing rectangle) of the connected segments respectively, wherein the mass is the number of pixels included in a connected segment, and wherein the diagonal is the length of the diagonal line of a rectangle capturing the connected segment;
whitening pixels in connected segments that are within a diagonal threshold, wherein the digital threshold is the length of the diagonal line to be between 0.01 in. to 0.05 in.

Also disclosed is a bitonal process further comprising:
exporting the image data to binary values and compressed using a compression standard.

DETAILED DESCRIPTION

The present disclosure relates to improvements in document image scanners.

Section 1: Landing

Landing introduction: The first step in any image processing system is gathering data from an image source, such as an imaging camera that is scanning the document. This data may be loaded onto the processing stages in various ways, including from an image file or directly from an imaging camera. Either source must contain information about each pixel in the image (red, green, and blue values) and information about the relative location of a pixel within the image. Landing is defined as the process of gathering the image data and placing it in the memory (inside a kernel in the host computer), and performing analysis of said data to identify image features/characteristics required for subsequent image processing Landing Image File Data: There are several standard industrial file formats for storing image data. Landing the data from an image file involves understanding the file format, extracting the data from the file, and storing the data in memory in a pre-defined format. The stored information comprises the location, the color data (red, green, and blue) associated with each pixel in the image. As the image is being landed, the available image data or scan lines can be used to begin the next stage processes. The camera outputs the scanned image in the RGB color image format with three individual channels, red, green, and blue.

Front and rear cameras: There are two cameras in the scanner; one is placed above the document track looking below on to the top (or front side) of the document, which is called the "front camera". There is a second camera which is placed underneath a transparent glass which is looking up to the back side or bottom (rear side) of the document, which is called the "rear camera". These two camera capture images separately and transfer to the host computer storage through parallel paths.

Figure 1:
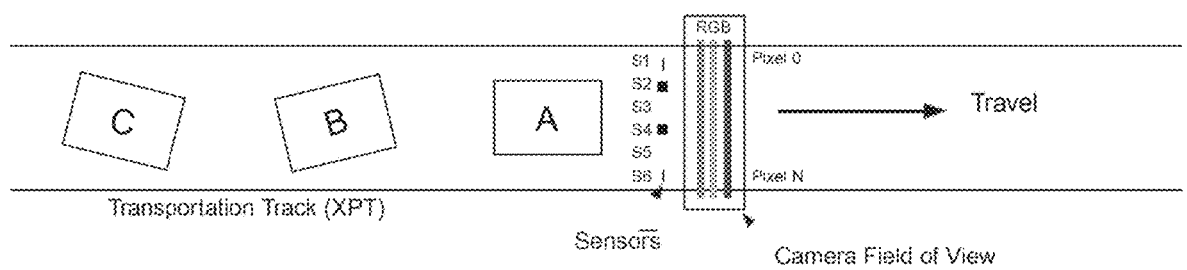
FIG. 1 is a schematic view of documents transported via a conveyor underneath a line scan camera for collection. Documents are denoted as A, B, C on a track XPT and travel in the noted direction under and/or over a scanner/camera which has sensors s1-s6 (or any other number) which produce an output such as RGB.

Landing Camera Image Data] For document image processing, a conventional camera type used to gather image data is the "line scan camera." As shown in Image Formation (FIG. 1), documents are transported via a conveyor underneath a line scan camera system that holds the imager (camera) and a light source to illuminate the document. The imager preferably uses three lines of single-color sensors (red, green, and blue, or RGB) capturing color data for each line of pixels (or scan line) across the document. By concatenating the precisely timed lines of data, an image of the original document is obtained. FIG. 1 illustrates such a system.

Image capture process: In this implementation, the sensor array detects the leading edge of a document in the transport and communicates to the camera system. See FIGS. 2 and 3 for more details.

The camera module is activated based on the input from the sensors that detects any documents on the transport or document track. The front and rear camera then captures scan line frames which is then transferred to an interface device. The interface device converts these captured line frames synchronized with the clock data into scan line bitmaps. These bitmap images of scan lines are transferred to the host computer memory where the image processing software resides These steps (scan line capture, converting scan line frames to scan line bitmap, and transferring to host computer) happen separately for the front and rear cameras in parallel paths.

Figure 2:
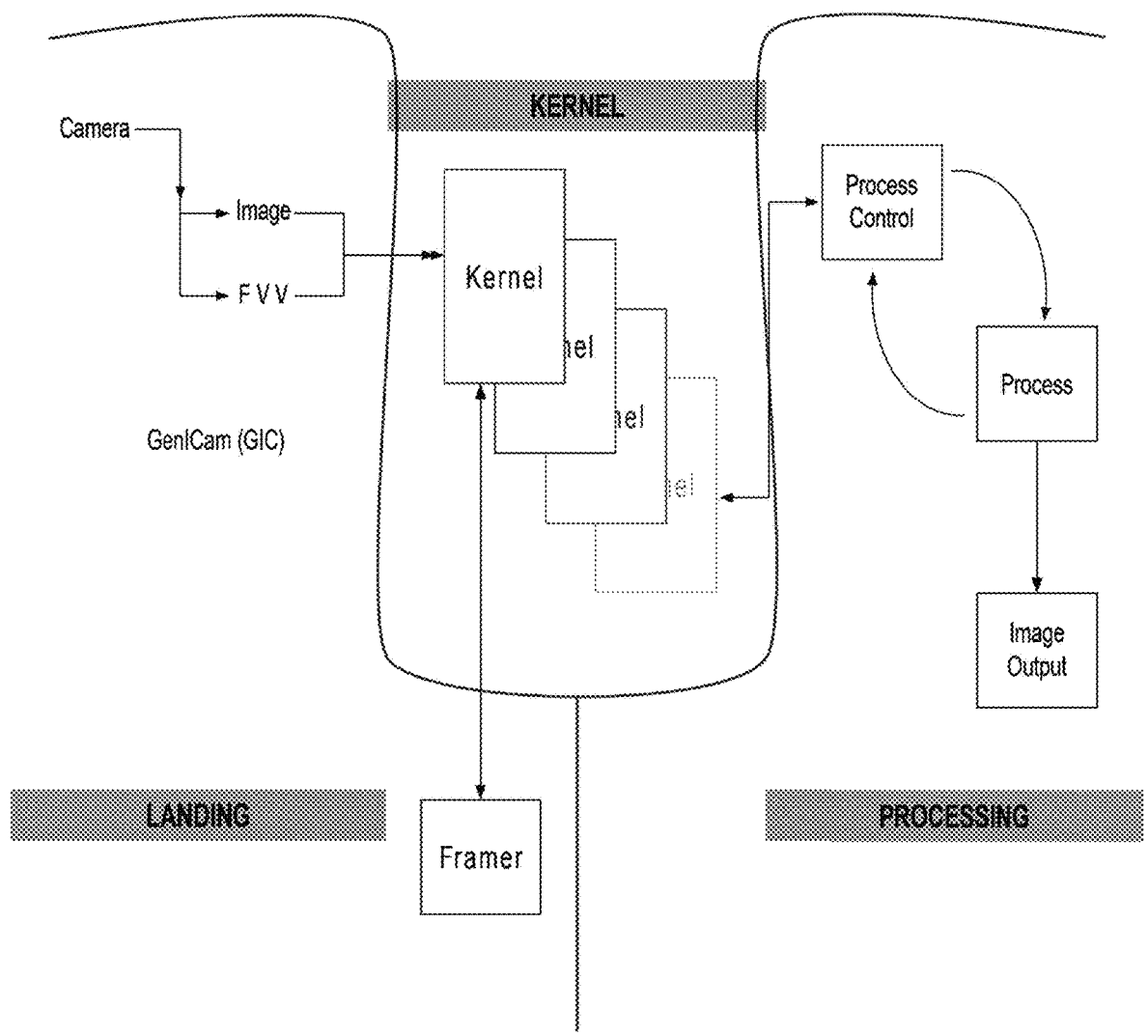
FIG. 2 is a schematic view of part of the processing with landing and post processing.

The interface device holds the previously captured scan line data until it has successfully received the next set of scan line data. FIG. 2 illustrate such a process. Note that the term Kernel does not correspond exactly to the industry nomenclature but is defined as shown.

Landing process: The data from the camera is delivered to the system as grouped scan line buffers (collection of predetermined number of scan lines) of fixed width containing contiguous pixels represented by RGB triplets (data structure of three bytes each representing color components Red, Green, Blue) to form the image frame. Grouped line buffers are distinguished as Start of Frame (SOF), End of Frame (EOF), or intermediate. Grouped line buffers are delivered contiguously beginning with SOF, followed by intermediate buffers, and ending with EOF (in the case of file source, all buffers may be combined as a single buffer). Receipt of the SOF buffer begins the process of landing, starting a pipeline cascade which provides the operations required.

Document border and inter document gap: The sensor array timing is set up to allow the captured image to contain approximately 0.5 inches (1.25 cm) of belt border around the top and bottom, left and right of the document, to aid with cropping. This gap of 0.5 inches allows for precision error from limited number of sensors on track when item is skewed and prevents document cut-off. If the image capture is beyond the user configured maximum image length, an error is reported. Additionally, a minimum inter-document gap is required to accommodate for skew, which is calculated based on the entry/exit timing from the sensor array to the camera field of view. The minimum gap is configurable by the user, and the track will stop if documents are closer than this predetermined gap.

Resolution of the camera: The timing of pixel data captured on a line, and velocity of the document traveling down the transport determine the optical resolution of the camera in the transport or Y direction. This resolution of the camera is 300 dots per inch (DPI) and the resolution is adjusted for different track speeds by scaling the incoming video from 300 to 200 dpi. The document width (direction perpendicular to belt travel, X-direction) is always captured at the native DPI of the camera. For example, a 300 DPI camera, with a field of view of 13.01 inches, yields 3904 pixels for each scan line. The speed of the transport and the line or raster rate of the camera determines the resolution of the image in the length direction (direction of belt travel, Y-direction, or the height). If this resolution is different from the cross-belt DPI (300), then the resolution in the X-direction is scaled to be equal to the resolution in the Y-direction during landing so that the captured pixels are "square."

Document queue: Raw image data coming from the camera is stored in multiple buffers in the memory. Multiple images can be held in a queue while other images are processed, to allow for latency in the system.

Landing the image—normal & orthogonal: When landing the image, each document is preferably captured in two orientations: normal orientation and orthogonal orientation. While being landed, the image is also converted to a grayscale image (details in next paragraph) in normal orientation only, to use for downstream framing and barcode processing. This results in three instances of each document. Having these normal and orthogonal instances of the document speeds up downstream processing because there is no need to access different memory locations to rotate the document later. Specifically, these orientations in separate buffers reduces the cache misses and thus provides faster memory fetches.

Figure 3:
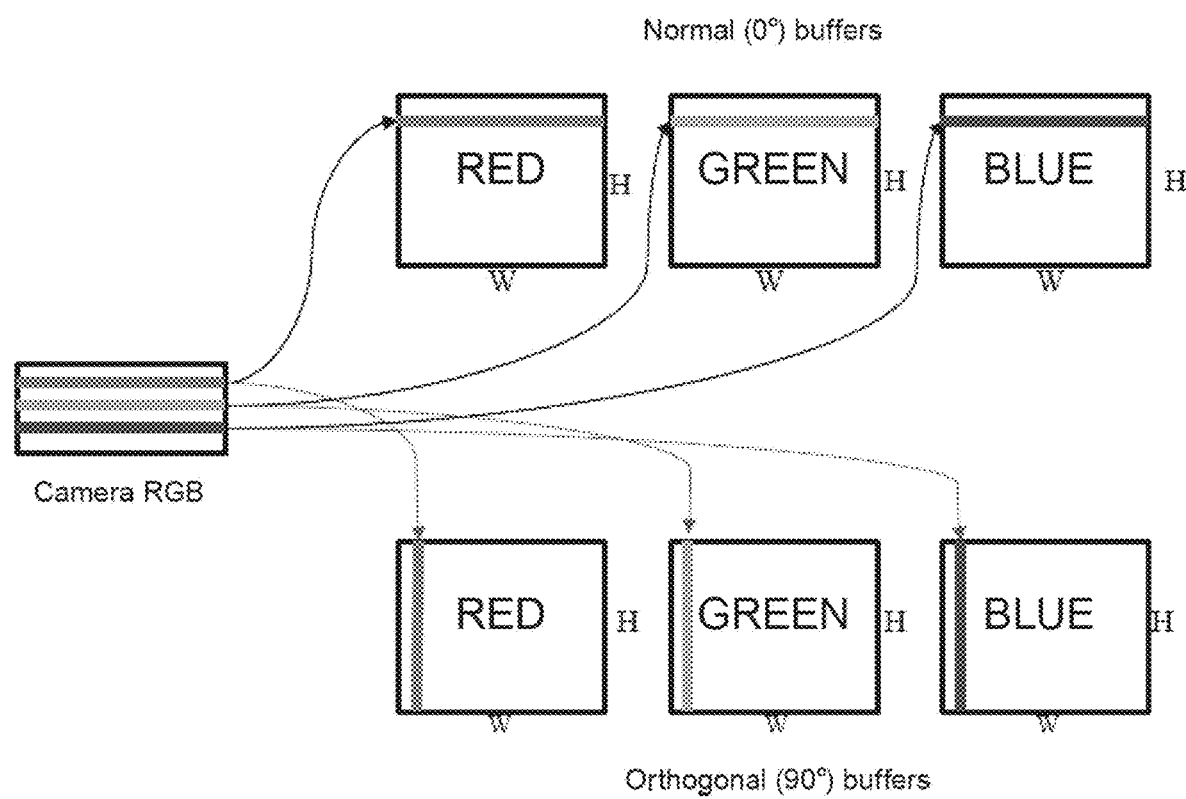
FIG. 3 is a diagram of the output of the camera to RGB buffers in normal and orthogonal orientation simultaneously.
Figure 4:
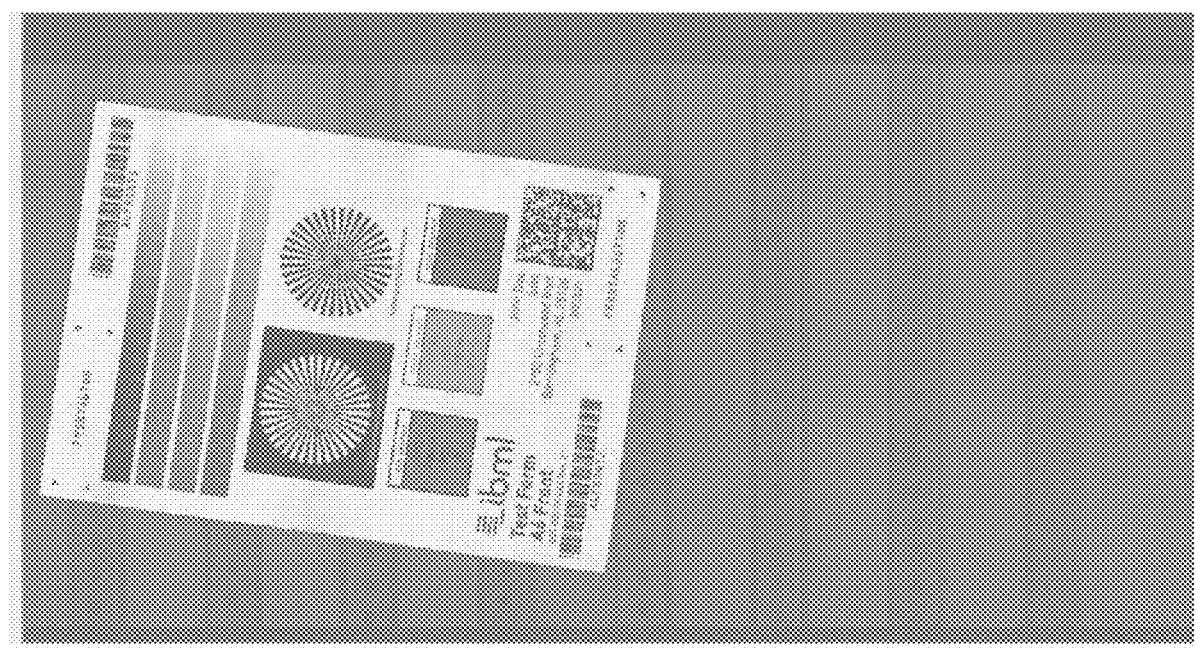
FIG. 4 shows an image of an example document with a slight skew on a transport belt. An input scanned image or the "full frame extent" which contains the item or document and the track background.

FIG. 3 illustrates how the RGB data is transferred to separate RGB buffers in both normal and orthogonal orientation preferably simultaneously. This enhances overall speed of processing since the normal and orthogonal data is immediately ready for use at the same time.

The orthogonal data is rotated 90 degrees before writing in the memory. This rotation is accomplished for each of the three color-planes, R, G, and B (see FIG. 3). The landing of the image in both normal and orthogonal orientations significantly increases the processing speed and reduces longer memory fetches by reducing cache misses caused due to non-contiguous memory access. Thus, R, G, and B are stored in three buffers, and the orthogonal R, orthogonal G, and orthogonal B are stored in three separate buffers.

Grayscale image: The grayscale image is created using the luminance or Y component generated from RGB (red, green, blue) to YCC using a BT.601 (formerly CCIR) conversion process and stored as the pre-processed capture (PPC) image. In the YCC image, "Y" channel is the "luminance" channel or component, and CC represents the two "chrominance" or color channels "Cb" and "Cr". The chrominance or CbCr components are used for other functions such as whiten, later in the processing stages. The created grayscale image can be made available for subsequent processing (framing and/or pre-process capture, PPC) in real-time as soon as the entire document is landed. This allows for these processes to start in parallel while still landing the document.

Interstitial time: Interstitial time is the finite time-period between buffers of multiple lines of pixel data received from the camera, which can be used for other processing. Rather than waiting for a defined event, such as the end-of-capture, to process pixel data, the data is processed (that is, landed—in normal and orthogonal orientations, and then framing begins—which evaluates edges, determines skew, determines item corners and crops) in-between the receipts of individual line buffers (line buffers correspond to the individual scan lines delivered from the camera). Therefore, many of the landing and framing processes (not all processes, due to a pipeline delay) occurs during this interstitial time of receipt of landing buffers.

Storing in memory & vector processing: Each of the incoming scan line data is an array of structures (AoS—an array where each element is a structure of the same type. where each index in the array is a structure of the RGB triplet representing a single pixel. This data is converted to a structure of arrays (SoA) as it is landed. The structure consists of three arrays, one array for each of the three color-planes (red, green, and blue). This places the pixel-data of each component in contiguous memory, which speeds up the memory fetches by reducing the cache misses which otherwise would occur in a non-contiguous memory access.

With the data stored in this manner (contiguous data, as Structure of Arrays (SoA), vector processing (also called SIMD, single instruction, multiple data) can now be utilized. This vector processing contributes to a substantial increase in the processing speed, as multiple pixels can be called from memory using significantly lesser instruction cycles and save times when accessing memory.

Color space, rear/front camera formats: Although image processing is not affected by what color space/format (sRGB, RGB, Adobe RGB, CIELAB, CMYK) the data is collected in, all captured data is preferably in sRGB or RGB (configurable) color space. The conversion from raw camera RGB to sRGB is performed within the camera using a pre-loaded, read-only color conversion matrix (CCM). Additionally, rear side camera, where the scanning is duplex (two sides of the document), which is upside down and backward in orientation to the front camera, needs the lines of the video data to be flipped in two orientations: horizontally (end-to-end), and color sequencing from the normal R-G-B to B-G-R. This flipping occurs in the camera prior to the interface device, so all data presented to image processing is consistent, except that the image origin is swapped.

Section 2: Kernel Processing

Kernel introduction: All the data for the image frame is accumulated to a data structure identified as a kernel. The kernel is the primary control item in the process and is tracked throughout the system process, connecting the processes of Landing and Image Processing. Kernels hold raw image data and all associated data collected/generated (cropping coordinates, barcode information, deskew information, framing data such as image histograms, etc.) during the processing. The kernels thus act as a facilitator which interacts with the image capture hardware and processing modules, to receive data and feed it into various processing stages. The normal and orthogonal images are landed in a kernel, which is then used for processing.

Kernel storage details: Kernels store the image in individual color components i.e., RGB, and store the following two orientations for each of the three color components.

Normal to the frame.

Orthogonal to the frame.

Normal and orthogonal orientation benefits: Different buffers contain the normal and orthogonal data for each color component. The normal buffer is used for output orientation of 0 and 180 degrees while the orthogonal buffer is used for 90 and 270 degrees. It is faster to read memory when pixel data is contiguous. This way, the processor can access all the pixel data with one memory fetch and not have to jump around to different memory locations.

Normal buffer has the scan line width of bytes between contiguous orthogonal rotated pixels.

This allows for quick access to the orthogonal orientated image data. Otherwise, it would significantly reduce efficiency to generate the orthogonal rotation later. Performance is significantly improved by utilizing two sets of buffers when orthogonal rotation is specified. Examples of what is stored in buffers are red data, green data, blue data, red transpose data, green transpose data, and blue transpose data.

Most applications require orthogonal rotation of scanned items as the document may not always be scanned in the correct orientation. Operating this way allows for maximum throughput since documents can be fed quicker but require the document to be rotated 90 degrees to be in the proper orientation after scanning.

Section 3: Framing

Framing introduction: The framing process isolates a region of interest by defining four bounding edges for an item and four points that correspond to the intersecting projections of those edges. These four points define the region of interest. The framing process analyzes and estimates the morphological features of the document in order to separate the document from the full frame. The morphological feature refers to the region of interest—defined as the smallest area of the image which contains the item targeted for scanning. The item can be in two formats: Item frame—the smallest rectangle oriented to the scan; and the smallest parallelogram defined by 4 corners oriented to the item The frame extent represents the fully captured document, before isolating a region of interest and performing de-skew or cropping operations (which are performed outside of the framing process). Any document scanned needs to be adjusted for skew and be isolated from the track, instead of considering the frame extent as the scanned image. The framing process aims to find the boundaries of a document. Once the valid boundary edges of the item have been established (at least three edges/sides), an angle between one of those item edges and its corresponding frame extent edge can be used to determine item skew.

The search for document boundaries is performed in the four perspective views (left, right, top, and bottom) of the document. The perspective view refers to the 1-dimensional view of each side of the document. That is, left perspective view is the 1-dimensional view of the document while looking at the document from left side.

Figure 8:
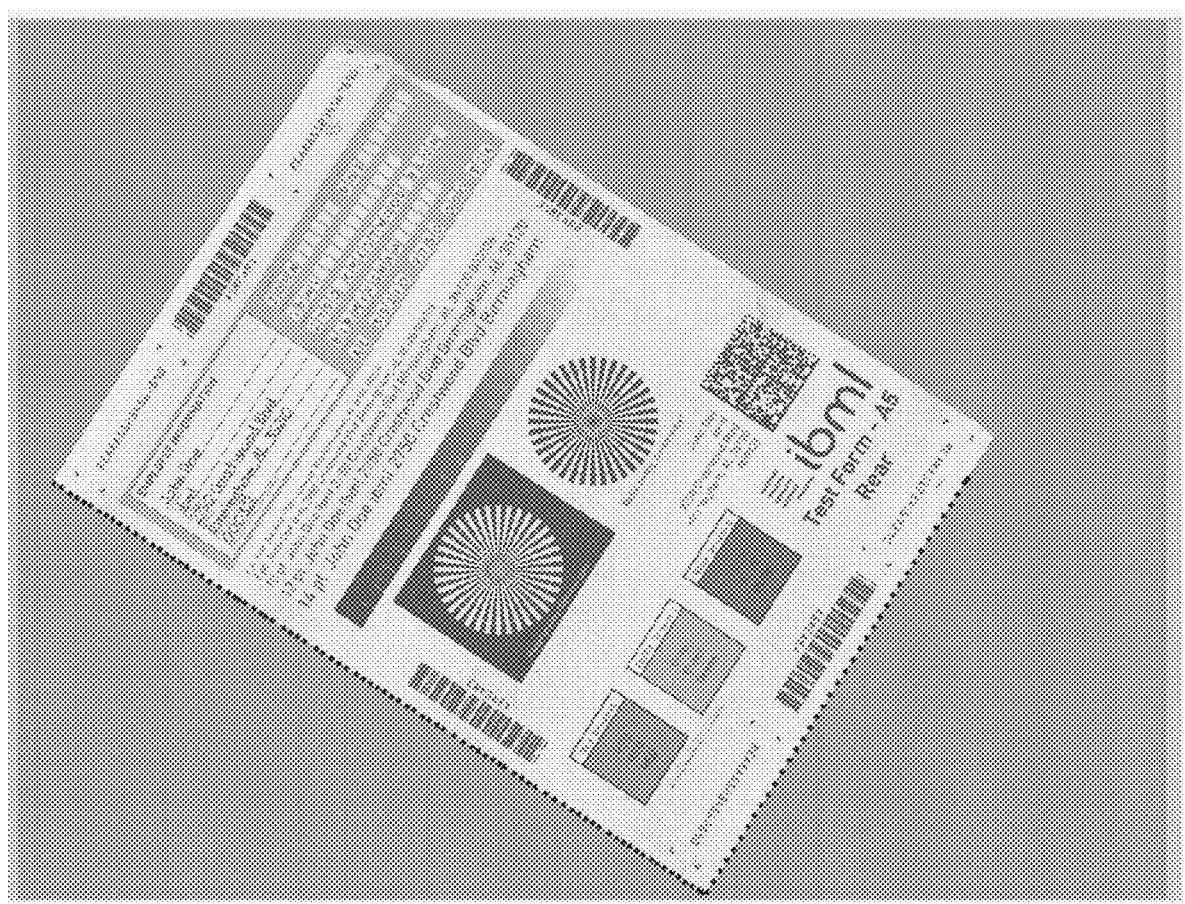
FIG. 8 shows the critical points search stopped since 95% of critical points are found.

Typical framing case: Reliably finding the boundaries of a document within the captured frame requires the background surrounding the document to be in high contrast to the document. Typically, lighter documents are surrounded by a dark black background. FIG. 8 depicts the raw captured image of a light document traveling down a document transport on a black background. The image shown is the input scanned image or the "full frame extent" (fully captured frame) which contains the item or document and the track background. The objective of the framing process is to extract this document item from the full frame extent.

Figure 5:
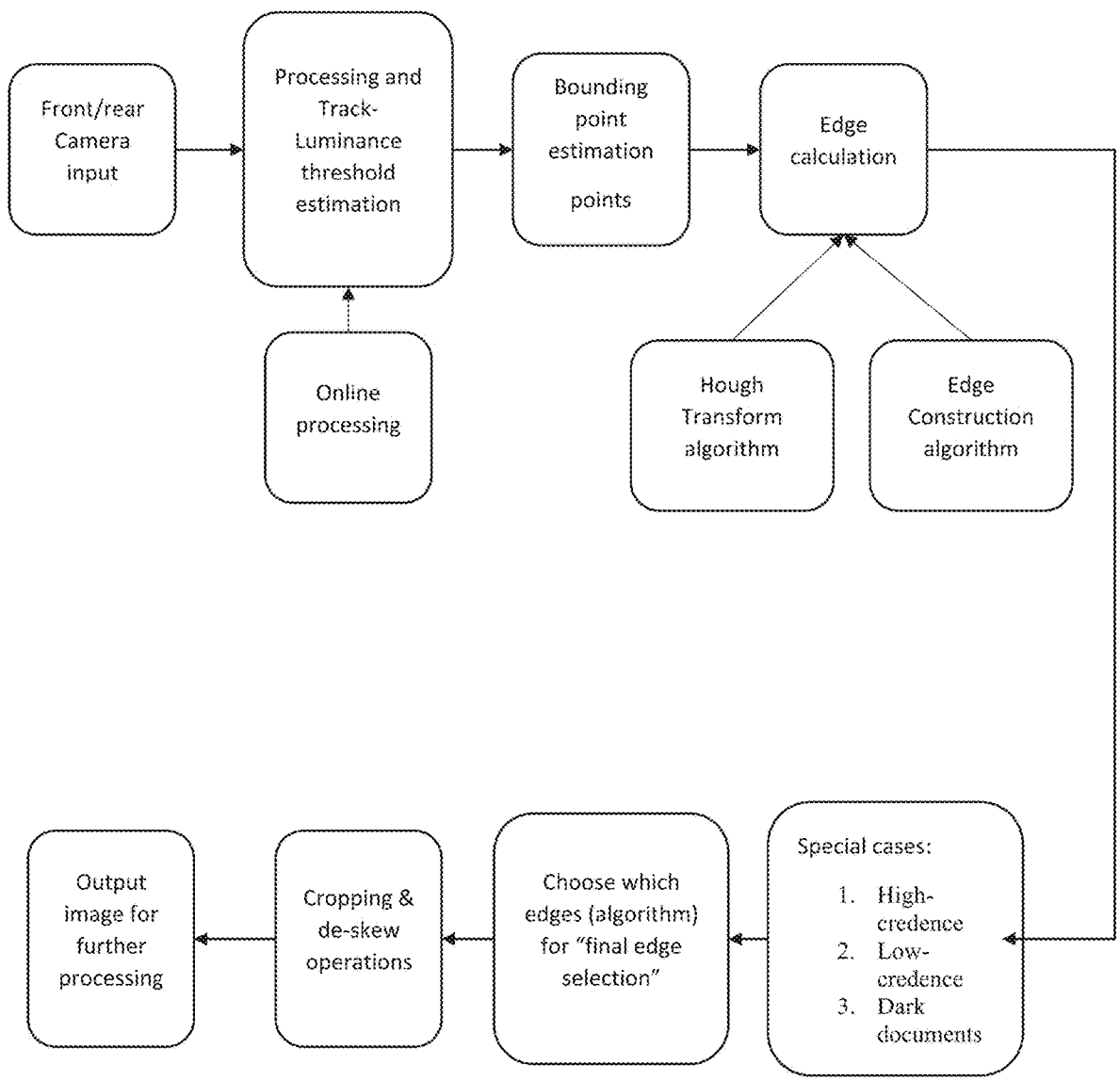
FIG. 5 is a flow chart showing a framing process in overview.

An overview of the framing process is given in the flow chart (see FIG. 5). Detailed description of each stage follows.

Online processing: Online processing refers to the real-time processing of a document while being captured in a scanner. For online processing, when a significant number of lines of the image are available, approximately 0.5 inches/1 cm, the search for the first edge of the document can begin. There needs to be a minimum gap (preferably 1 inches/2.5 cm) between consecutive documents to frame the image. Mechanically on the transport, skew sensors will detect an error if documents are closer than a predetermined amount of distance.

Online processing—track threshold estimation: The track is scanned between the passing documents to estimate the track luminance, to aid with the isolation of documents. A track luminance threshold is determined by taking the maximum luminance/brightness value measured from the track and multiplying it by a gain factor. The luminance/brightness value determined above is capped by a user-configurable parameter with a default luminance/brightness value derived empirically. This capping prevents the threshold from being too high. An example is the use of 1.4 (140%) as the gain factor, and capping luminance at a value of 80. Both these values are derived empirically and dependent on the type of transport used and the nature of documents involved.

Bounding point, critical points & left to right: Once the threshold level has been determined between foreground and background, the edge detection algorithm searches for background to foreground transition. This starts with the left side of the normally landed image frame and moves right searching pixel by pixel for background or document by checking against the estimated threshold transition for each line. Note that this process begins while the image is still being landed. This foreground/background transition needs to occur for at least $\frac{1}{20}^{th}$ of the resolution in order to be marked as a bounding point. For 300 dpi, this is 15 pixels, and for 200 dpi, this is 10 pixels. This minimum transition width prevents the false-positive triggers caused by noise in the image and further loss of documents due to a threshold. A bounding point is assigned where the first transition is found (if a transition is found). These bounding points are consolidated into critical points based on a collinearity test, that the points are tested to be determined to be in a line, which is further explained later in this section. Thus, multiple bounding points are consolidated into a single critical point. See FIG. 8 for an example of critical points found from the left view.

Figure 6:
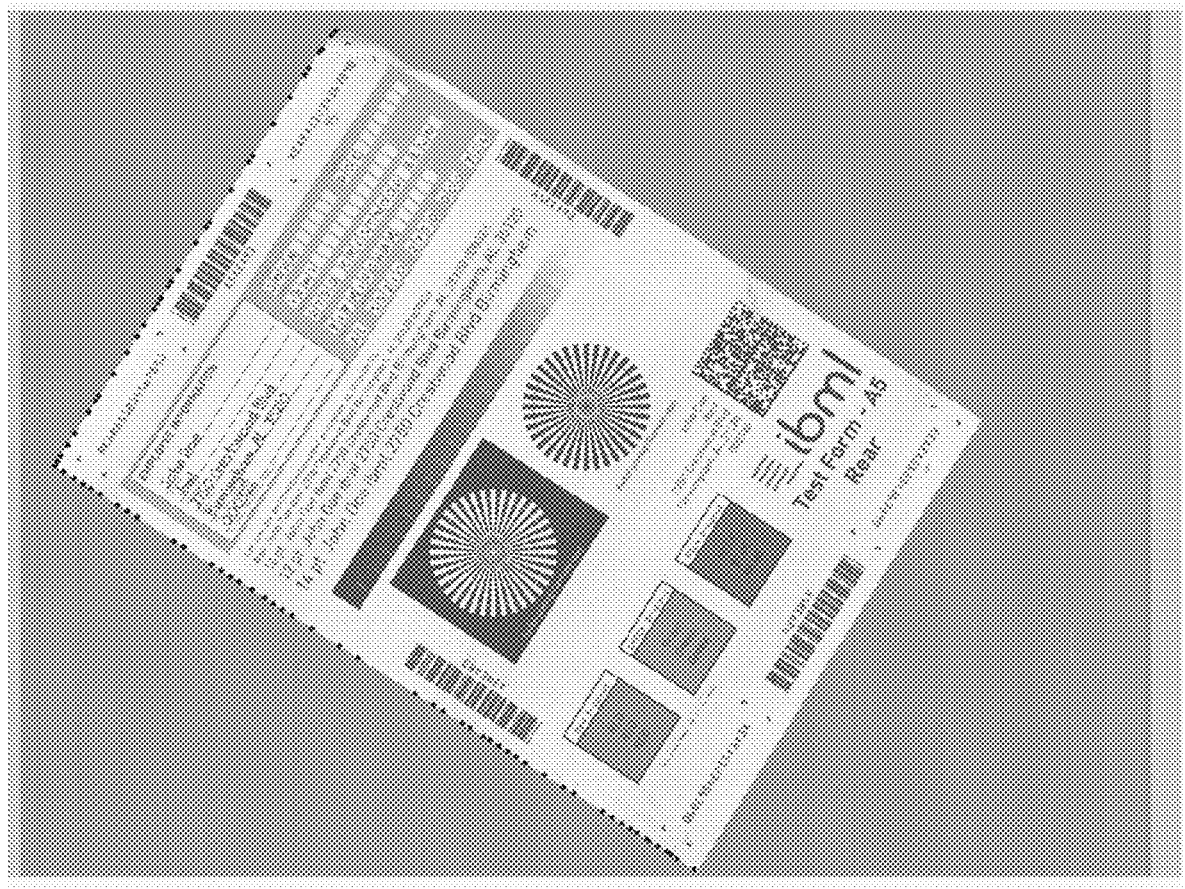
FIG. 6 shows the critical/bounding points established from a right to left scan.

Bounding point, critical points—right to left: In parallel, edge detection starts on the right side of the image, moving left looking for a bounding point in the same manner as scanning from the left side. If scanning from the left side passes the pixel being scanned from the right side, and there is no bounding point in either scan, then processing stops on that line. In this case, no critical point is assigned, and the process continues to the next line, searching for transitions. This process is repeated until all the lines in the landed document is scanned both from left and right. See FIG. 6 for an example of critical points found from the right view.

Bounding point, critical points—top and bottom: Once left and right scans are completed, the top to bottom edge scanning is performed. Once the entire document is landed, the scan from bottom to top to find the bottom boundary begins. These top and bottom scans are only looking within the bounds determined by the edges established by the left and right scans. Points outside of the frame width (established from left and right scans) are ignored.

Figure 7:
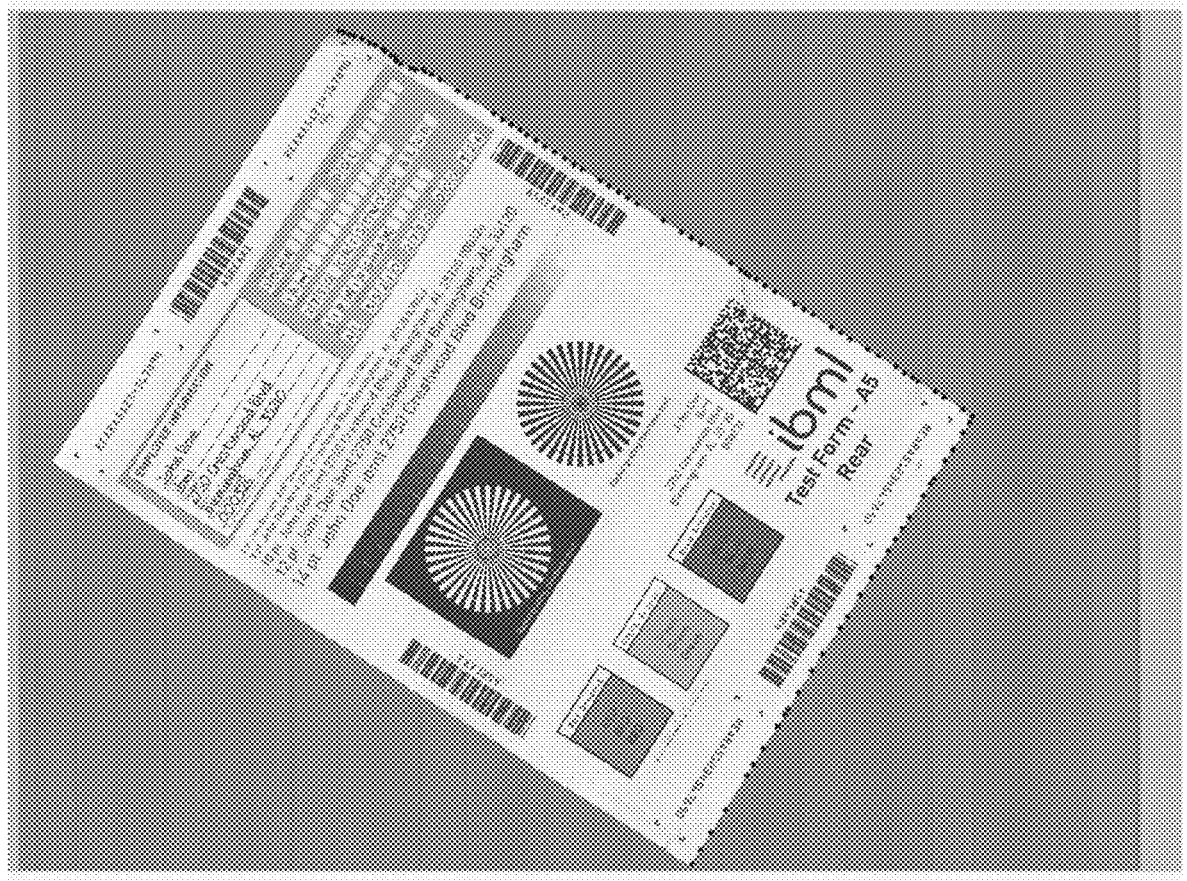
FIG. 7 shows the critical/bounding points established from a top and bottom scan

For the top scan, an empty "container" (empty coordinate array boundary) is created that is the extent length (full length) of the line between the extreme left and extreme right points established during those scans. The scan begins at the top and then moves down the document looking for bounding points in the same manner as the left and right scans (looking for transitions over the threshold of at least $\frac{1}{20}^{th}$ of the resolution). When 95% of this container (space within the projected boundary lines) is filled with bounding points, processing stops, and the rest of the line can be extrapolated from the gathered points/groups of conforming points. Scanning for the bottom edge is performed in the same manner as the top but moving up the landed document. See FIG. 7 for an example of bounding points found from the right bottom view. Note that the bounding points preferably stop after 95% of the points have been found.

Frame extent case: If the left and right scans do not find any bounding points for the entire scan area or the top and bottom scans cannot fill up at least 95% of their containers, cropping and deskew cannot be performed. The boundaries are then the full extent of the entire window.

Bounding points into critical points: To reduce computation load, bounding points that are consecutive and collinear are reduced to a single critical point and given a weight. The cross-product is a vector identity and is used to determine if bounding points are collinear. The first bounding point encountered is initialized as a critical point. The second contiguous bounding point is used to define a temporary line segment with the first point, while it is also consolidated into the second critical point by incrementing the critical point's weight by one. The next bounding point is tested for collinearity using the vector cross product The line between the first two bounding points is treated as one vector, and another line is created between the bounding point being tested and one of the first two bounding points. The cross product is applied to these two vectors. The magnitude of the cross product between two vectors represents the area of a parallelogram formed by those vectors, if that area is lower than a predetermined threshold, then we can consider the two vectors to be collinear, and therefore the tested point will be considered collinear. If the tested Bounding Point is considered to be collinear, the weight of the critical point will be incremented by one and the tested bounding point will not be used further. If the cross product of consecutive bounding points is less than 12, pixels apart, the points are determined to be collinear. As many points that will fit into 0.5 inches/12 mm (this would be 150 points at 300 dpi) at the given resolution can be consolidated into a single critical point. In this case, this point would be given a weight of 150. This process reduces downstream processing loads.

Two algorithms: Once the bounding points and critical points (consolidated bounding points) are established, two algorithms are used to generate the boundary edges of the document.

Hough transform introduction: The first algorithm is the Hough transform. The Hough transform is a feature extraction technique that can isolate the features corresponding to a specific shape in an image. This is widely used in detection of lines, circles, ellipses and other parametric curves. The Hough transform extracts the location of the desired feature such as a line (defined by a parametric equation x cos(theta)+y sin(theta)=r; r is the distance from a point (x,y) on the line to the origin of X-Y axis, and theta is the angle of r with the X-axis). Hough transform is robust to noise and is tolerant to gaps or occlusions between the features. (https://en.wikipedia.org/wiki/Hough_transfonn).

Hough transform—details: In this application, a modified form of the Hough transform is used, which is explained in the next paragraph. This is a recursive way of implementation, where instead of running the transform in one pass, multiple iterations are employed to reduce the computational resources used. The Hough transform is fed the critical points (multiple bounding points are consolidated into a single critical point) found during the boundary detection process. The algorithm uses an accumulator array, where each bin in the accumulator represents the possible lines (distance from origin, and angle) passing through a bounding point, in the Hough parameter space. At the end of the Hough transform algorithm, the bin in the accumulator with the highest value represents the most likely straight line for all the bounding points fed into the algorithm. Once the likely line is chosen, the line is bounded by the highest bounding point and lowest bounding point for that edge view (there are four views, left, right, top or bottom).

Details on Recursive Hough transform: A recursive and modified version of the standard Hough transform is used here for better performance and resource utilization. The standard Hough transform is highly resource intensive and slow, and thus a modified version is used here for a balanced performance and resource consumption. Instead of searching a small area with stricter constraints, multiple iterations are setup so that it starts with a larger area and fewer constraints, and through the successive iterations, this search area is refined and with stricter constraints.

This refinement process is performed multiple times, for example, five more times (for a total of, for example, six iterations). Further iterations use the line chosen by the previous iteration for the reference line rather than the frame edge, as was used in the first iteration. Additionally, the search range angle is cut, such as, in half for each additional iteration. The second iteration will select any segments whose angle with the reference line (from the first iteration) is +/−15 degrees. The third iteration will select any segments whose angle with the reference line (from the second iteration) is +/−7.5 degrees. The fourth iteration will select any segments whose angle with the reference line (from the third iteration) is +/−3.75 degrees. This continues so on and so forth down to +/−0.94 degrees for the sixth and final iteration.

Edge construction algorithm: The second algorithm is the Edge Construction algorithm.

Algorithm overview: This algorithm takes the critical points (consolidated bounding points) as input. The Edge construction algorithm begins when the EoF (end of frame) is signaled and all the bounding points are established. The contiguous critical points undergo the cross-product test to determine their collinearity relationship. If they pass the relationship criteria, a line segment is created and the credence of the preceding point is increased, and the succeeding points are then inspected. As the algorithm analyzes these critical points, line segments formed are extended to associate them with the neighboring line segments. After the search is completed, the longest line-segment is chosen as the final edge.

See FIG. 8 for an example of collinear bounding points being incorporated into critical points.

Line segments from critical points: As mentioned above, line segments are drawn from the critical points using the cross product to determine collinearity. If the cross product is 10 pixels or less between critical points, then the points are determined to be collinear and are combined into a line segment. Note that this threshold is less than what is used to combine the bounding points into critical points as outlined in the previous section. These line segments are weighted (a proportion) by the number of critical points collected.

The points for the chosen line segment are passed through the Recursive Hough Transform algorithm process to establish an angle between the line and the full frame extent for the given view, which can later be used to establish skew angle.

Final line segment: For each iteration, a credence score is determined by comparing the number of points that fall on the line generated by the Hough Transform (calculated using previously discussed segment weights) and the total number of bounding points for that view. The resulting line with the highest credence score is chosen from the iteration.

The credence measure from the generated boundary edges of both algorithms are used in a Bayesian methodology to select which edges (generated from the above two algorithms) to use as the final edge. This Bayesian analysis is based on the a priori information, and thus the credence measure uses a set of decision steps or criterion (derived from empirical evidence suggested by failures found in the selection process) to arrive at the optimal final edge. The use of these two algorithms and this credence measure makes the edge or frame selection process robust.

The final line chosen from the last iteration is then shifted/translated to include all of the critical points for the view and converted into a finite line segment using the extents of all the bounding points collected for the view. This finite line segment and its associated credence score are returned as the chosen edge for the Edge Construction algorithm for that view (left, right, top or bottom).

Special case: High credence edges: During both the edge construction process and the Hough transform process, critical points that fall outside of the chosen edge are tracked. In each process, a translated edge is created, and has been shifted to encompass the measured critical points. This translation of edges is necessary to capture tabs and envelope flaps.

Figure 9:
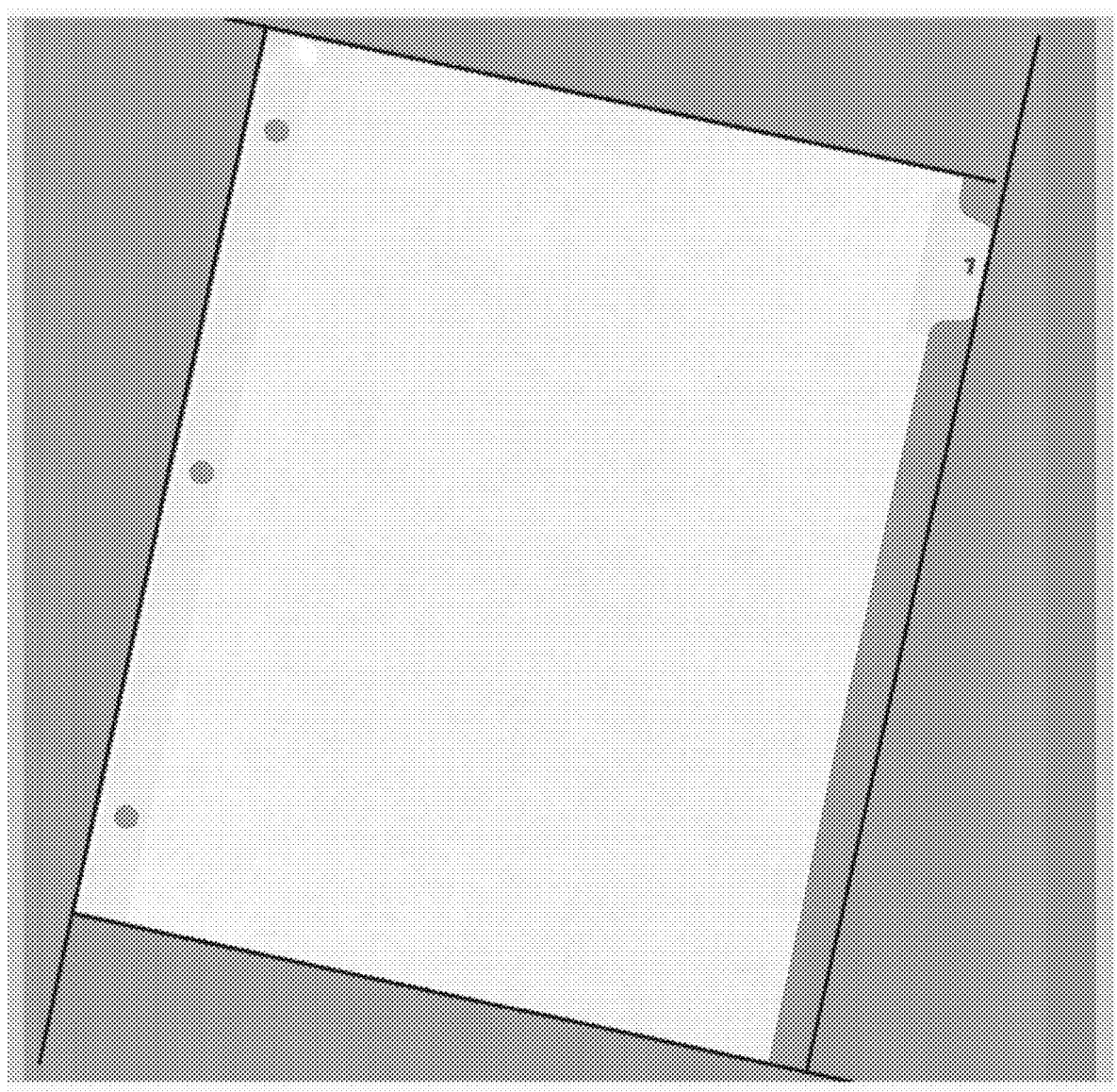
FIG. 9 shows the high credence case where the paper tab is also included in the region-of-interest.
Figure 10:
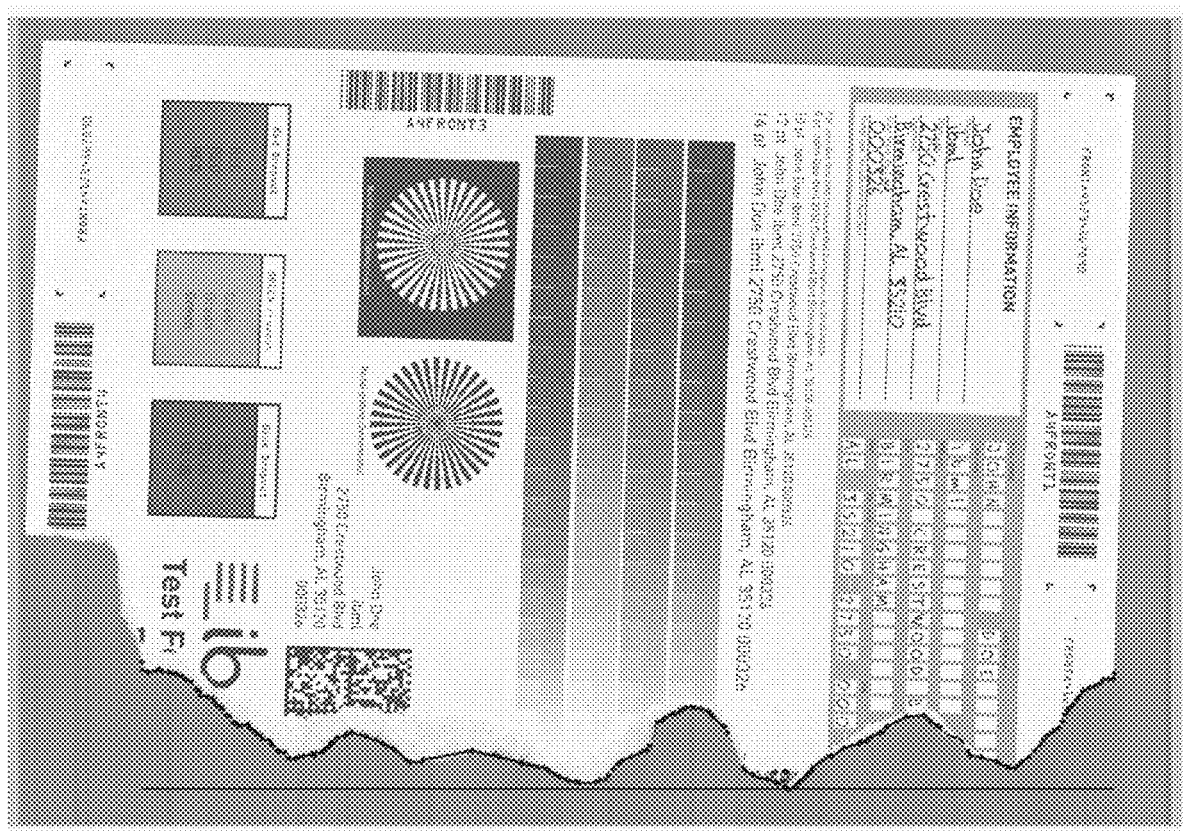
FIG. 10 shows low credence case where the final edge is selected at the outermost region such as with a highly irregular edge.

If the edge has a credence value higher than a predetermined amount, such as 36%, for example, then the edge is translated (shifted) outwards towards the frame extent until it encompasses all critical points found by that view. In this case, the translated edge will be parallel to the edge determined by the respective algorithm before translation and the credence is the same as the edge before translation. See FIG. 9 for four high credence sides. Note the left edge moved out towards the left extent edge to incorporate the tab. The left edge is still parallel to the document.

Special case: Low credence edges: For low credence edges (less than predetermined value, for example, 36%), the edge from the algorithms is disregarded, and the frame extent is used as a base edge. The frame extent is translated inward to the nearest critical point to create the final edge. Additionally, the credence is set to 0 to prevent accepting a low confidence edge. Note the bottom edge moves in from the bottom extent edge. The final edge for the bottom view is parallel to the bottom extent (edge) and not the document. Also if the bottom or one side edge has been determined with high confidence, the other corresponding edge is more easily found because it is most likely parallel to the edge of high confidence.

The important distinction between the high credence translated edge, and the low credence translated edge is that the high credence translated edge will maintain the angle and length of the high credence base edge that is initially estimated, ie parallel but spaced apart therefrom.

Special case: Dark documents: An exception case in the translation process is a dark document (whose median luminance threshold of the entire frame is less than a predetermined number such as 80). In this case, the fallback is to output the full-frame extents (untranslated), which means no document was observed in the captured frame.

Both versions of the translated edge can be used to include paper flaps and irregular documents in the cropping process.

Choosing between Hough transform and Edge generation algorithm: Choosing which algorithm to use:

For each view, the edge construction algorithm and the Hough transform algorithm both return independent edges with independent credence values. At the end of these respective processes, both the edge construction edge and Hough transform edges are already translated to include all critical points for a particular view.

Criterion for algorithm selection: For each view, the credence of the edge construction "edge" and the Hough transform "edge" are compared. The following is the selection criteria for each edge:

- If the Hough transform credence is a predetermined, n points (a predetermined number) higher than the Edge Construction credence and the Edge Construction credence is not 0, then select the Hough transform edge and credence. This is done because the Edge Construction edge is presumed to be more accurate, but this is a case where the Hough transform algorithm has worked better than the Edge Construction algorithm.
- If the Hough transform credence is over 90%, select the Hough transform edge regardless of the Edge construction credence. This is an exception type case where the Hough transform produces a high confidence result.
- If the Edge construction credence is 0, fall back to the translated edge when the credence edge is lower than m % (m is a predetermined number), as described in the Edge construction section, and assign a credence of 0. During the edge construction process, a low credence edge will be floored (fixed) to 0 so that a low confidence edge is not selected inadvertently.
- If none of the previously mentioned criteria are met, select the Edge Construction edge.

Criterion for des-skew/cropping: After the selection process described above is performed for each view (left, right, top and bottom), the edges are qualified as a set to determine how many valid sides a document has for the purposes of de-skew and cropping.

- If three or more (selected) edges have a credence of p % (a predetermined percentage) or more, then the document qualifies for de-skew operations, ie it needs deskewing.
- If there are less than three "good"/high-credence edges, then the item will be checked against the luminance brightness threshold of $L_T$ (a first fram line). The value of $L_T$ varies from device to device and type of transport. In this case, the value of $L_T$ is a predetermined value.
    If the median or average brightness value for the document is less than $L_T$, then the full-frame extents are applied as the four edges that define the region of interest, and no skew operation is performed.
    If the median luminance brightness value for the document is greater than a predetermined number, then all the edges previously established in the framing process (regardless of their credence) are used to define the region of interest, but no skew operation is performed.

Section 3b: Coordinate Generation (Cropping, Orientation Rotation, and Scaling), and De-Skew Rotation Cropping: The region of interest (ROI) calculated from the framing step is used to separate out the document from the fully captured frame. The four rectangular boundaries (left, right, bottom, top) of the document are stored as a series of coordinates which can be used to crop the image The system may be configured so that an image is cropped to any, all, or none of the bounding edges. The cropping process consists of converting these coordinates into memory locations and updating these locations, corresponding to the ROI boundaries, as the new document boundary. This new boundary therefore ensures that the area outside of the ROI is not included in further image processing stages or in the image output.

Rotation-Orientation: The motive for altering orientation is to have the orientation of output different from that of scanning defined by user configuration The rotate stage shifts the orientation of the document or ROI to 90, 180, or 270 degrees, as specified by the user. The coordinates of the four boundaries of the document is rotated here. The coordinates are simply column (x) and row (y) values. The values are ascending for 0 and 90 degree orientations while they are descending for 180 and 270 degree orientations. Column coordinates span the width of the image for normal (0 and 180 degrees) orientations) and the height for orthogonal orientations (90 and 270 degrees); likewise, for row coordinates.

Scaling: The motive of scaling is to alter output resolution from optical resolution of the system to a user specified resolution. For each window, line coordinates are generated for each pixel in the scan line. The line coordinates are mapped back to the frame coordinates. Scaling is achieved using bilinear interpolation is performed on the buffer generated from the line data. The memory locations of the coordinates are fed into a bilinear interpolator which outputs the corresponding scan lines. The mapped line coordinates are constrained to fit within the captured frame.

Rotation-De-skew The documents on the scanner transport might be skewed to certain angles, rather than horizontal or vertical. The skew angle is used to determine the degree of skew. The boundary of the document established during the framing stage is compared against the frame extent (fully captured frame) boundary, to calculate the skew angle. A rotation of the document by the skew angle is performed in the opposite direction of skew. The direction of skew can be clockwise or anticlockwise, depending on the orientation of the boundary to the frame extent.

Section 4: Cascading Pipeline

Introduction to cascading pipeline (CP): When documents are captured into the system, they are landed in the kernel. The kernel represents the storage location of information collected from a document scan/capture. This kernel is handled by a control block which tracks each item in the queue and setup the required stages according to the configuration, and then feeds these into a "cascading" pipeline, which is how the image will be processed through the system. This cascading pipeline makes it possible to run multiple processing stages in parallel and significantly increase the processing speeds. In the cascading pipeline, each processing stages runs on an independent thread (which are requested from the operating system), and these threads are run in parallel.

High performance software must be written to leverage efficiencies gained by reducing cache misses and cooperation with the operating system's task scheduler. Efficiency is achieved by decomposing large task into a series of incremental task based on small units/packets of work (UOW). For image processing, rather than operate on the entire image, the system operates on individual lines within the image. This offers advantage by reducing task execution time (maximizing free processors/resources for the OS) and localizing memory access to small units of work (reducing cache misses). This is orchestrated by developing a generalized processing paradigm: The Cascading Pipeline.

The Cascading Pipeline abstracts the definition of incremental tasks into stages. Stages are processing elements which provide individual threads for processing of the incremental task. Stages have explicit inputs and outputs; and are connected output to input (Pipeline) to achieve multi-threaded processing capacity. The UOW is processed by a stage and passed to the next stage in a serial form. Multiple UOWs may be operated on in parallel as each stage (thread) should be scheduled to operate on a separate processor (cascade). If the number of UOWs exceeds the count of processors, all processors can be fully utilized by the pipeline.

The overall pipeline consists of several UOWs in a work pool, an initial stage, intermediate stages, and a final stage. The initial stage pulls a UOW from the work pool, initializes the UOW and passes it through the stage's output to the next stage's input; repeating as necessary to complete the overall process at hand; pausing when work pool is exhausted. Intermediate stages perform their operations on the UOW and pass the UOW through its output to the next stage's input. The final stage is defined by its output not being connected to an input, where the UOW is then returned to the work pool after processing. Efficient resource management is accomplished by limiting the number of UOWs available to the pipeline. Cache misses are reduced because the UOWs (being small and limited in number) can exist within the cache for the duration of the pipeline.

Example of CP: landing/image processing: Processing moves from one processing stage to another while other stages are working in parallel. As an example of this parallel processing, the very first processing stage is landing (as discussed earlier); while landing, pieces of the kernel get passed on to the framing stages (there are multiple framing stages). As discussed in the landing section, framing starts while the document is still being landed. In addition, other image processing stages can begin to operate in parallel while the image is being landed. With this paradigm, multiple processing stages are thus being operated in parallel.

Processing stages—configurable; pass limitation: Some of the processing stages are always run, and some are added based on user configuration. For example, a configuration for a color window would have color output. There may be no reason to do bitonal (black/white) processing in this configuration. For this reason, the pipeline is assembled dynamically based on the user-specified configuration. However, there are some limitations based on the pass configuration (will be explained further on in this document), that there can be at most one color image, one jpeg image, and three bitonal image outputs per pass.

Processing stages—examples: Examples of processing stages are, having a stage that is taking a derivative of every pixel just for the x-direction (likewise a stage for the y-direction). There can be a stage just for converting RGB to YCC. Additional example stages include generate, rotate, Mod F, kernel index, Interpolate, Dropout, YCC, land frame, and land pre-scale. With this granularity, it becomes easy to measure the speed of each stage, which can be used to optimize the "slow" processing stages. This is an added side benefit of the cascading pipeline.

SIMD/vector processing: Further speed gains are obtained by using SIMD (single instruction, multiple data) processing (also referred to as vector processing).

Figure 11:
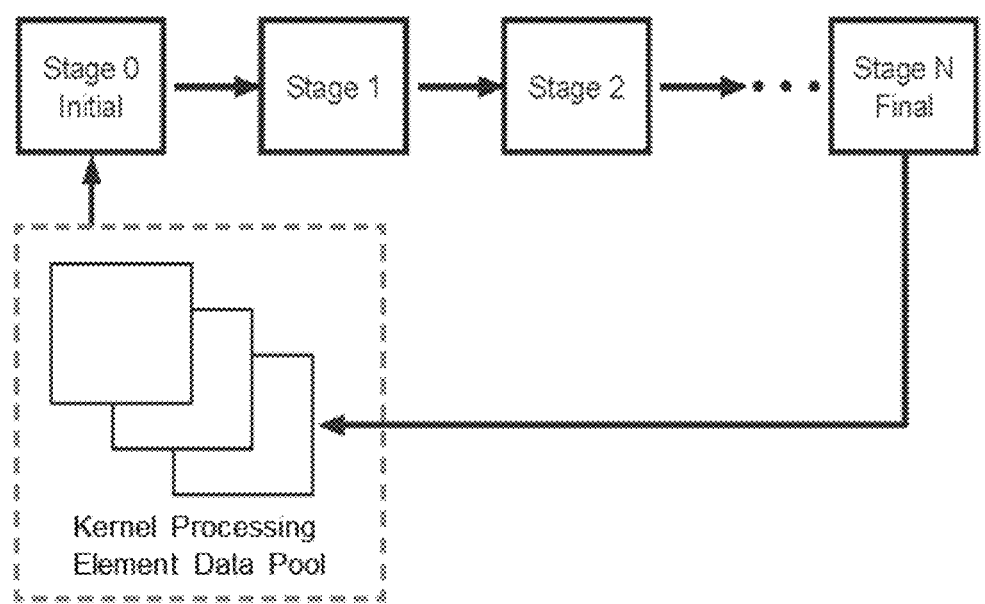
FIG. 11 shows a flow chart for a cascading pipeline

FIG. 11 shows the high-level cascading pipeline. Each stage is an independent processing thread, and the thread scheduling is done by the operating system (OS). Various scan lines are available to different stages at the same time. For example, when stage 0 is processing scan-line n, the previous scan line n−1 is available to stage 1 for processing, and so on. Throughput is managed by the available buffer data pool and the availability of a processing element.

Figure 12:
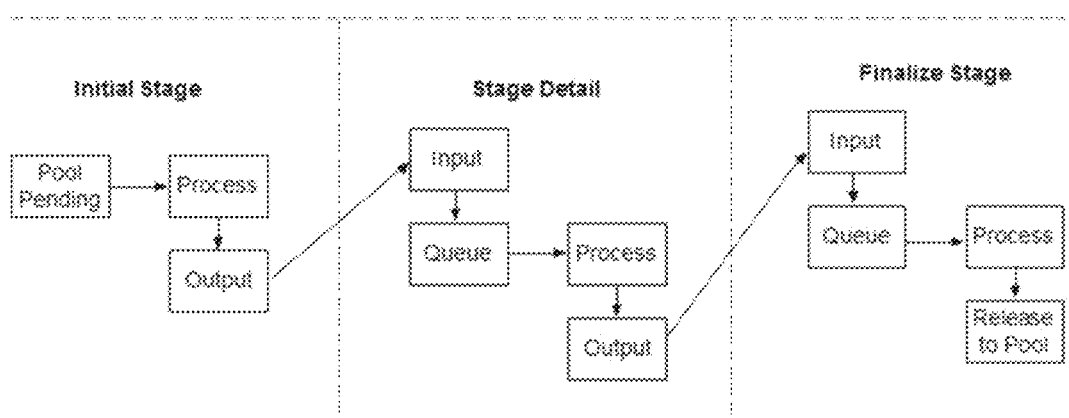
FIG. 12 shows a flow chart of a generic stage processing that is used throughout the image processing.
Figure 13:
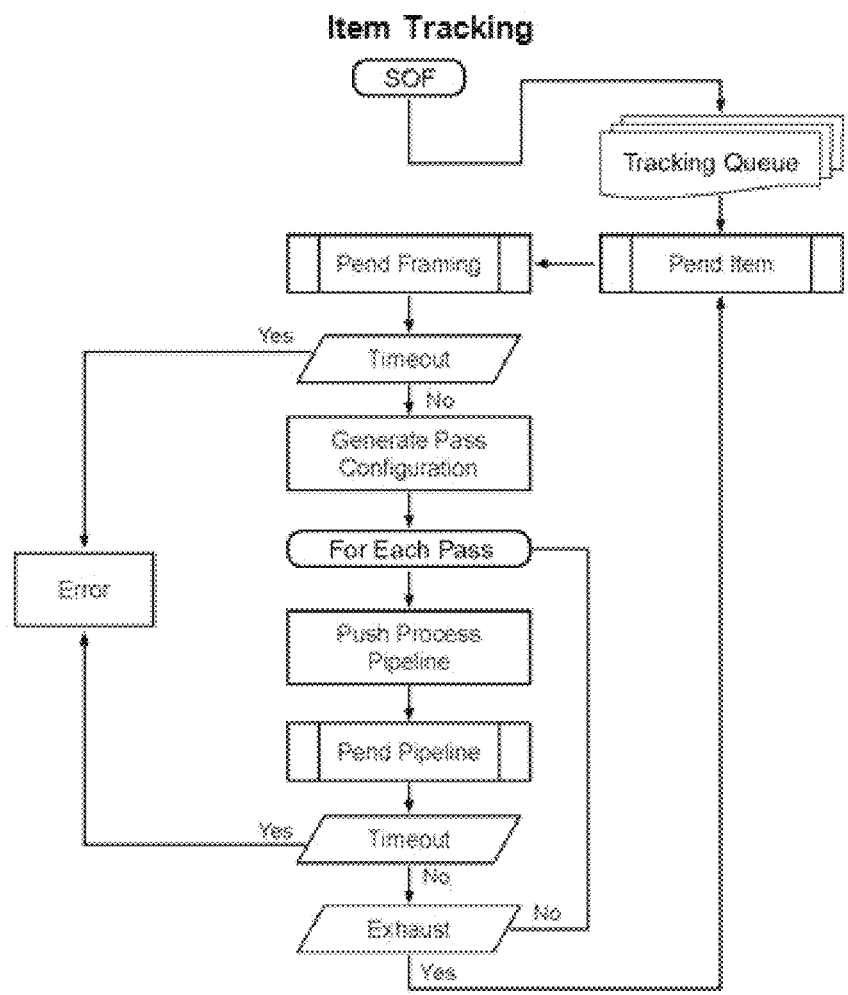
FIG. 13 shows the pass configuration setup—item tracking and image processing pipeline
Figure 14:
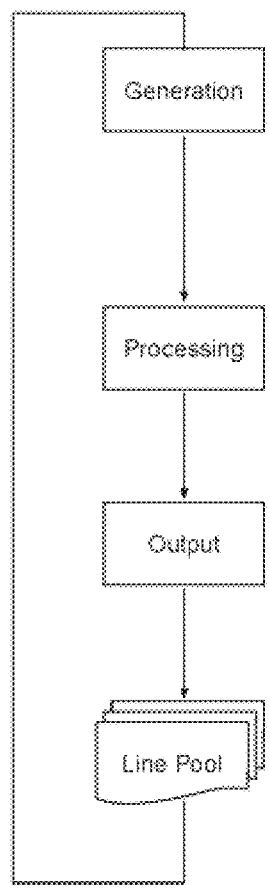
FIG. 14 shows a high-level overview flow chart of the image processing pipeline.
Figure 15:
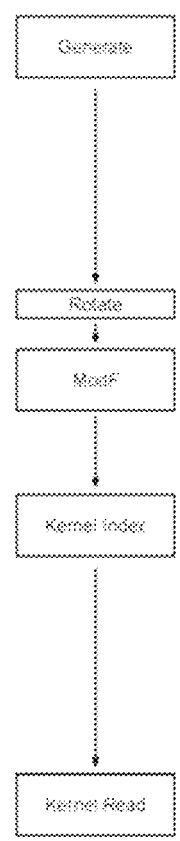
FIGS. 15a (generating step) and 15b (processing step) show the generation and processing stages in image processing pipeline.
Figure 15B:
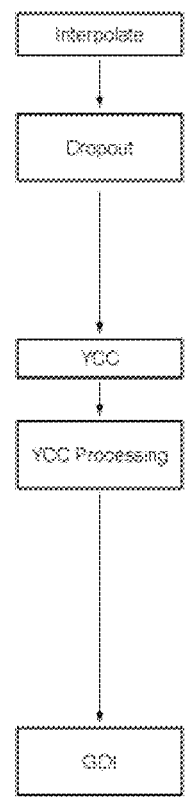

Various stages in pipeline: FIG. 12 shows the details within each stage. There is an "initial stage" that takes the processing element from the pending pool and a "finalize stage" that releases the processing element back to the pool. There can be any number of stages in between. The output of one stage is connected to the input of the next stage. These connections between stages can be reconfigured based on the required processing stages. These stage configurations are managed by a control block, which is discussed more in the pass configuration section. Having so many discrete stages allows for computing resources to be freed for other processes as stages complete. For each stage in between the "initial stage" and "finalize stage" there are:

Input—data received from the previous stage

Queue—buffer data until the process is available to use the data

Process—represents the processing that will occur in this stage

Output—data that has been acted on by the process

Section 5: Image Processing Pass Configuration

Introduction of pass configuration setup: A decision on what needs to go through the image processing pipeline and how many times does it need to go through the image processing pipeline is determined in the "image processing pass configuration setup". This is a control block between the input image data and the cascading pipeline tracks the items in the queue for processing, and configures the processing associated with a queued item and runs it using the cascading pipeline. Windows are processed in "passes." A window is the user-configured view of the scanned output image. For example, a user can configure a scan output window to be 'color' and 'rotated at 90 degrees', and another window to be 'bitonal' and rotated '270 degrees. A pass is defined as the minimum working unit for the image processing as it can be configured by the user. Passes are also the maximum configuration of a pipeline.

Overview and item tracking: As the image is completely landed, it moves up in the item tracker where it does 'processed tracking.' This process creates a 'pass list,' which defines all the characteristics of the configuration that is fit inside a pass, such as scaling, rotation, or color processing. The relevant image windows with these common processing characteristics are included in one pass, also considering the pass constraints (defined later in this section). If the pass constraints are met, a new pass is configured to accommodate the extra windows. This pass list is fed into the cascading pipeline to process the windows according to the characteristics defined in that pass.

Pass constraints: Passes are constrained by configuration similarities and codec count, described by the following:
1 Color JPEG Codec per pass;
1 Grayscale JPEG Codec per pass;
Up to 3 Bitonal Codecs per pass;
1 Color Uncompressed Codec per pass;
1 Grayscale Uncompressed Codec per pass;

Resolution—the desired number of pixels per inch in the output window. The resolution is always the same number in the x and y directions and needs to be the same for all windows in the pass Orientation/rotation—specifies the direction of the window. This orientation is an orthogonal axis rotation. One of 0, 90, 180 or 270 degrees. All windows in the pass must be in the same orientation.

Deskew—removes the small angle skew between the origin and the window.

Color Dropout—color dropout function identifies the pixels that are matching a color specification and uses the Y channel to push the luminance up in order to accomplish the dropout. More details on color dropout can be found in section 6. There can be only one color-dropout configuration per pass. The color dropout option applies only to the bitonal windows. Additionally, windows not utilizing the color dropout configuration may be processed with windows that do in the same pass.

Windows in a pass and overall speed: Typically, only one pass should be required to provide all user-configured output windows. There is no restriction on the number of windows that can be configured. However, the practical configuration typically will have less than four windows. Passes are calculated at the start of processing for each scanned item. Windows specified that do not fit into the image frame are ignored (i.e., running an A6 document but setting a window as if running an A3 document). The number of passes required for an item affects the overall processing throughput (i.e., the more passes required, the longer it will take to run). The Sky Lake® Intel processing architecture is currently used. With this architecture, the observed throughput is ~200 million pixels per second. The image output is provided in the order the image processing is completed. This isn't necessarily FIFO, as some subsequent documents may process faster than earlier documents.

Section 6: Color Dropout

Overview of color dropout: Color Dropout is the process of altering targeted color(s) in an image, forcing saturation (push towards maximum) of targeted pixels. The motive is to reduce the effects of targeted colors on bitonal outputs, making the targeted colors appear as background—being excluded from the bitonal output. We do this by generating a mask of matched colors and choosing a gained Luminance (rather than unprocessed Luminance) for pixels associated with the mask, where the gain characteristics are specified by the user. Generation of the mask is a multistage process which utilizes the HSL color space for matching user specified colors and requires calculating Chroma (colorfulness of the pixel), Hue, Saturation and Lightness. The color dropout is then achieved by amplifying or gaining the luminance or Y channel towards white, and thus the color channels are not affected. The gain is applied after the YCbCr conversion stage, creating two Luminance buffers allowing both Dropout and Non-Dropout outputs to run on the same pass. Color Dropout is not intended for color or grey scale outputs and is only available as a diagnostic output for those outputs.

The user can enable or disable the color dropout option and can provide a 'color specification' which is used to identify the pixels for applying the color dropout. The color specification consists of a 'hue', 'saturation', and 'lightness' value. The RGB image is first converted to a HSL color space for pixel identification. The pixels that are identified as matching to a color specification are selected for the dropout. The color dropout consists of applying a gain or offset or clip to the luminance values of the selected set of pixels.

Figure 16:
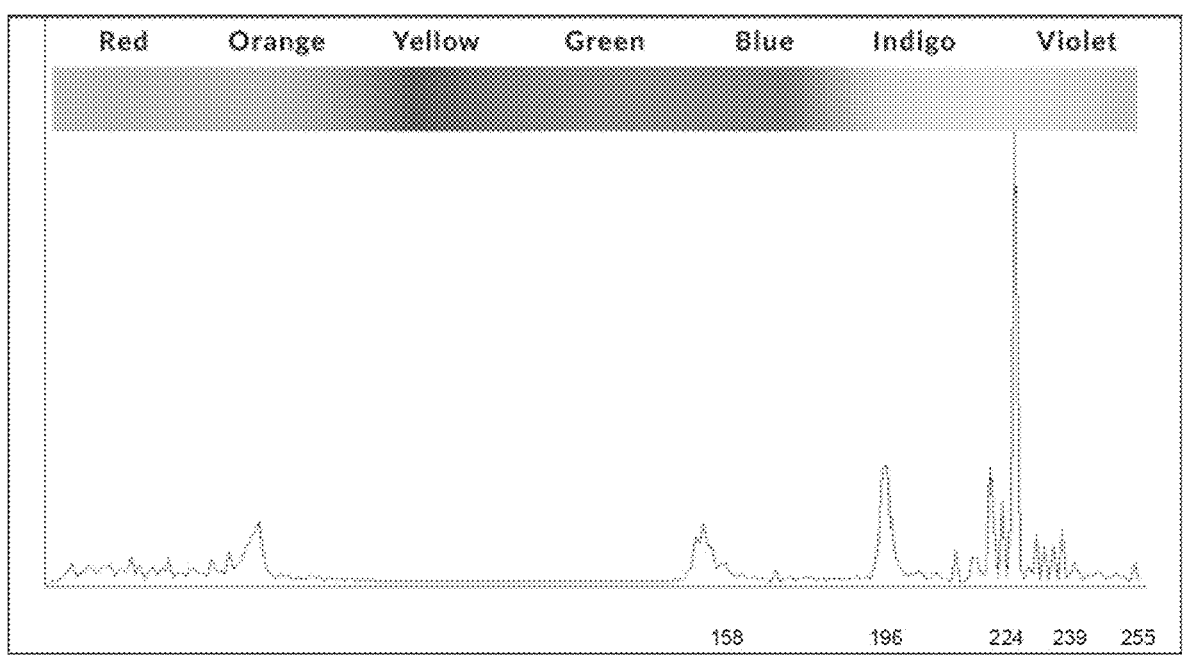
FIG. 16 shows a picture of the modified hue histogram based on the Hue Saturation Lightness model. This translates a square to a cylinder.

HSL model and custom mapping: In this model, colors of each hue are arranged in a radial slice, around a central axis of neutral colors, which ranges from black at the bottom to white at the top. In the custom mapping of the HSL model, the shades of pink are placed on either side of zero. This is done to prevent any "wrapping" of high angles (350-360 degrees) to low angles (0-10 degrees) and under the assumption that pink is rarely found in office documents. This makes the implementation simpler, and this technique is not typically done in HSL models. In typical HSL/HSV models, red is the primary color that wraps from 360 degrees back to 0 degrees. Green is at 120 degrees, and blue is at 240 degrees. The central axis comprises neutral colors ranging from black at lightness 0 at the bottom and white at lightness 1 at the top. In our implementation, the modified hue is an integer in the range of 1-255. 0 equates to disabled. Green is 127. Red is 43 (84 values below green). Blue is 211 (84 values above green). See FIG. 16, Modified Hue Histogram Example for the cylinder of colors.

User configuration parameters and options: There are several options that need to be defined for the color dropout specification. Various parameters/options and a range of dropout values are added to provide more flexibility to the user. The selected options are applied to the luminous values of the pixels in the image in the HSL color space to find which pixels match these specifications. Hue is the color of the pixel to drop out of the image. Hue span is the range of color to drop out. Saturation is the distance of the RGB point from the Z-axis. The saturation span is the range of saturation intensity level to drop out. Lightness is the lightness tone level to drop out. The lightness span is the lightness tone level range to drop out. For a pixel to be dropped out, its pixel values must fall in the hue span, saturation span, and lightness span in the color dropout specification.

Dropout parameters/options: A certain threshold is applied to prevent pixels below a specific chroma value from being selected for modification. This protects against accidentally dropping out low color items, which are typically dark text and accommodates for any color tint that may appear.

Gain is the amount of luminous gain (multiplier) to apply on pixels matching the specification.

Offset is the amount of luminous offset (additive) to apply on pixels matching the specification.

Clip is the clip level of luminous modification (luminous value is constrained to be lower than the specified value) on pixels matching the specification. This is the ceiling for modifications specified by gain or offset. Clip is typically used for non-white documents. When dropping out certain colors, it is desired that the brightness value of the dropout-modified-pixels match the brightness value of the non-white background and not be totally white as these would end up as artifacts in a binarized image.

Section 6b: Brighten

Image Brighten is the process of saturating the brightness of the image. The motive is to reduce texture in the background, where the background is considered to be the brightest parts of the image. This is achieved by amplifying the luminance channel of the entire image such that all the bright parts are saturated to a user defined target.

The brighten function is a processing step in the cascading pipeline. The implementation of various functions as stages in the cascading pipeline plays a critical role in parallel-processing and speeding up the brighten function.

The YCC image (obtained from RGB to YCC conversion) is used to estimate the group of pixels to which the brighten function is applied. The brighten function is specifically applied to the Y-channel or the luminance channel. The histogram of the luminance channel, and the cumulative distribution function (CDF) of this histogram is first calculated. The user specifies a percentile and a color tint threshold to define the gain parameters. The CDF is constrained by the color tint threshold so that only the pixels above this threshold are considered for the target bin calculation. The Cumulative Distribution (CDF) of pixels brighter than the threshold is utilized to derive the histogram bin associated with the specified percentile. The gain is the ratio of the specified target and the percentile target found; unity gain is used if no pixels were found above the specified threshold. This estimated gain is applied to every pixel in the luminance or Y-channel of the image.

Section 6c: Whiten

Overview: Image Whiten is the process of altering the tint of an image. The motive is to reduce color in the background, where the background is considered to be the brightest parts of the image. This is achieved by amplifying the color channels of the entire image such that color of the brightest parts will approach to zero (grey). This function is similar to the brighten function in terms of parameters and implementation. While the brighten function is applied to the luminance channel of the document, the whiten function operates on the color or chrominance channels (Cb and Cr).

The whiten function is a processing stage in the cascading pipeline. The design of the cascading pipelines with multiple stages that operates in parallel speeds up these functions, compared to operating them without a cascading pipeline Algorithm overview: The YCC image is used for analysis and the whiten function is applied to the Cb and Cr channel, while the luminance channel is untouched. The histogram, and the cumulative distribution function (CDF) of the histogram is calculated for both Cb and Cr channels. The CDF is constrained by the color tint threshold so that only the pixels above this threshold are considered for the target bin calculation. The Cumulative Distribution (CDF) of pixels brighter than the threshold is utilized to derive the histogram bin associated with the specified percentile for each color. The gain is the ratio of 1 and the percentile target found. The calculated Cb and Cr gains are applied to all the pixels in the image, separately for Cb and Cr channels.

Section 7: Image Processing Pipeline—JPEG Codec

Overview: Image Processing Pipeline—Output (JPEG Codec(s))—High Level: the creation of the JPEG image is based on libJpeg version 6B. The color and grayscale JPEG creation steps are essentially the same flow. Only the headers are different, and the color JPEG has the addition of Cr and Cb (chrominance) components in addition to the Y (luminance) component. The steps/descriptions listed here are the basic steps in the JPEG standard split into pipeline stages for efficiency.

Subsampling option: Color components may be sub-sampled, if chosen by the user through configuration. This improves (decreases) the file size. Note there is no improvement on performance because subsampling requires resources close to that of the samples eliminated. Subsampling does reduce image quality. But usually this loss of image quality isn't apparent to the naked eye. It can't be seen unless significant zoom is utilized. Also, this subsampling increases generational loss (i.e. when images are opened, modified, and saved more of the image is lost each time). This generational loss is more obvious when converting these images to bitonal images and a gradient effect may be observed in plain backgrounds. Artificial edges are created in the output as an artifact. In this implementation the compression ratios are 4:2:2 (subsampling ON) and 4:4:4 compression (without subsampling). The subsampling option can be enabled or disabled by the user. If the subsampling options is turned off, a 4:4:4 color subsampling ratio is used where the ratio indicates the proportion of the three color components (Y, Cb, Cr). A 4:2:2 ratio is used if the color subsampling option is turned on.

5 stages of JPEG codec pipeline: Each color component (Y, Cr, Cb) of the JPEG utilizes 5 stages/threads.

Stage 1: For the first stage, the window is picked from the scan lines, the resolution is down scaled if specified in the configuration, the pixel data is converted to 8×8 matrices (pixel data is arranged in an 8×8 matrix (minimum coding unit—MCU)) and buffering data occurs (JPEG Component box).

Stage 2: For the second stage, a one-dimensional Discrete Cosine Transform is applied to the row data (DCT Row box).

Stage 3: For the third stage, a one-dimensional Discrete Cosine Transform is applied to the column data (DCT Column box). The DCT converts luminance data to a frequency response. Although this is a two-dimensional DCT, it is essentially two one dimensional DCTs. The output of the first (row) is used as input to the second (row).

Stage 4: For the fourth stage, coefficient encoding applies a filter mask to the output coefficients from the DCT (JPEG Coefficient box). This achieves the quality/size ratio (Q-factor) specified by the configuration. Larger/more coefficients equal bigger file/higher quality.

Figure 17:
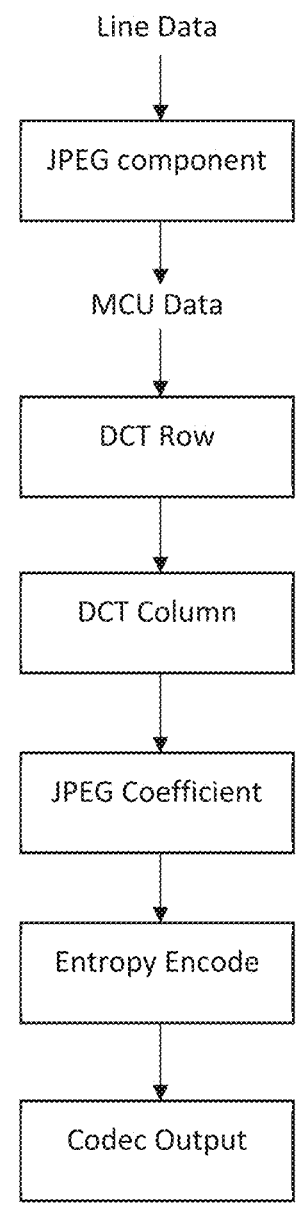
FIG. 17 shows a flow chart of the general steps for the JPEG image creation for the image processing pipeline.
Figure 18:
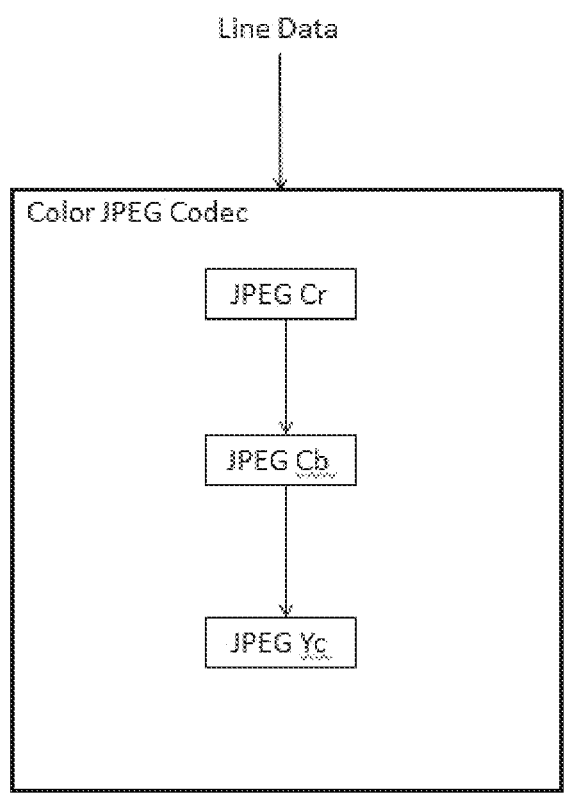
FIG. 18 shows a flow chart of the specific steps for the color JPEG image creation for the image processing pipeline.
Figure 19:
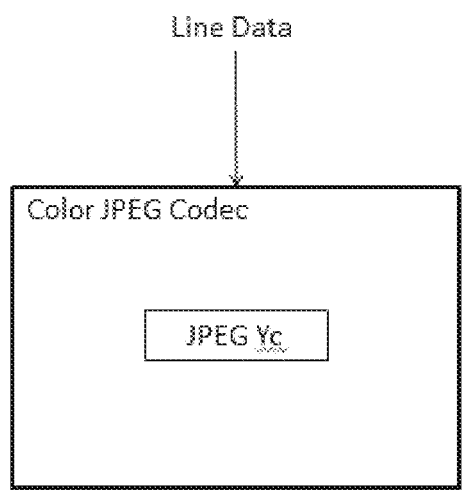
FIG. 19 shows a flow chart of the specific steps for the grayscale JPEG image creation for the image processing pipeline.

Stage 5: Lastly, entropy encoding reduces the bit stream from coefficient encoding (Entropy Encoding box). In this step, the coefficients are obtained from the Huffman Encoding lookup tables based on the quality factor. The output reduces bit patterns to codes by discarding 0s (Codec Emit Output box). See FIG. 17, Image Processing Pipeline—JPEG Component Details.

JPEG processing threads: The color Codec has an additional stage to manage the 3 (Y, Cr, Cb) component stages. This results in 16 threads (5 stages*3 components+1 thread to synchronize/converge the component threads into the color codec) total for the color Codec.

Figure 20:
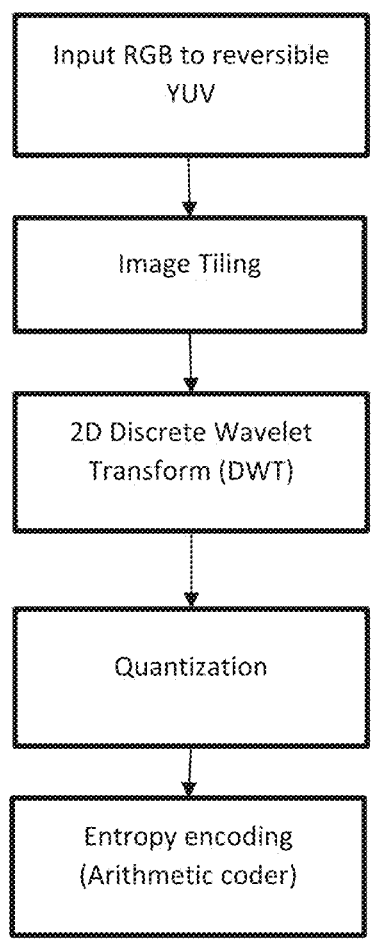
FIG. 20 shows a flow chart of the steps for using a JPEG2k codec.
Figure 21:
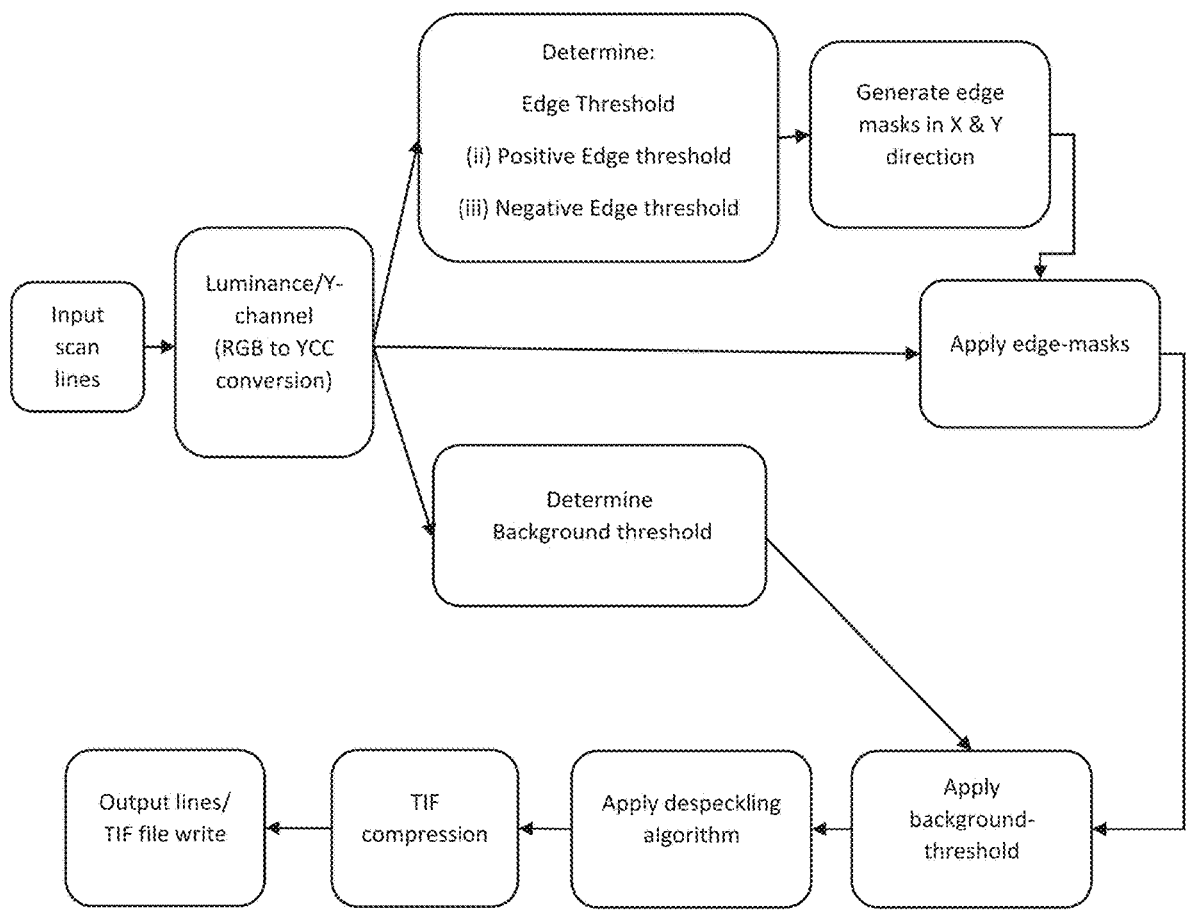
FIG. 21 is a flow chart showing a bitonal conversion (binarization) process overview.
Figure 22:
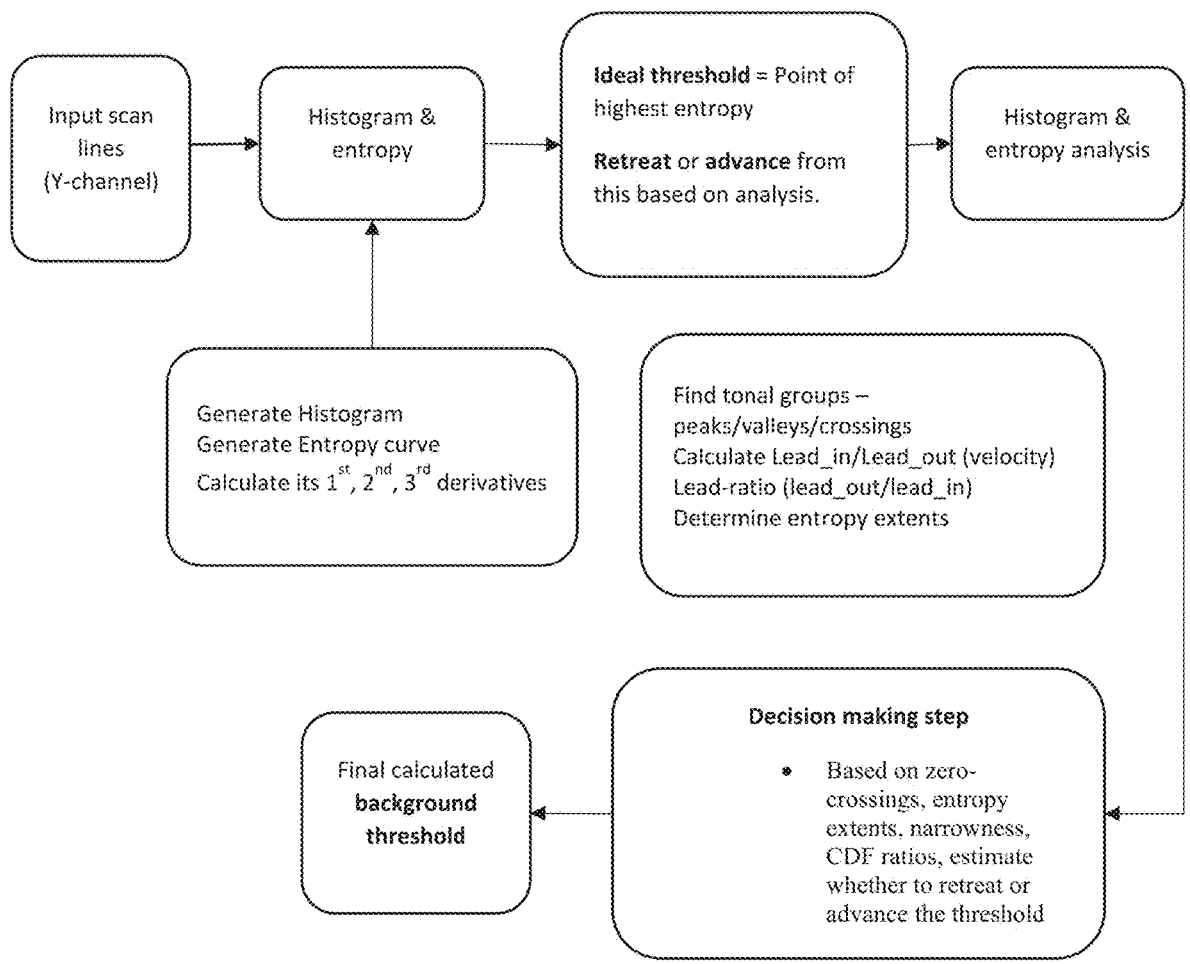
FIG. 22 shows the background threshold estimation algorithm overview.

Color JPEG codec details: Image Processing Pipeline—Color JPEG Codec Details, see FIGS. 21-20. The following sections describe these Figures.

Color JPEG Codec: Initialize on the SoF (start of frame). Finalize on the EoF (end of frame). Wait for all the components to complete. Then copy the component buffers to the codec buffer and report the codec complete.

JPEG Cr: for the Cr (red) component, perform the steps that were described in the JPEG Component Details on this component.

JPEG Cb: for the Cb (blue) component, perform the steps that were described in the JPEG Component Details on this component.

JPEG Yc: for the Yc (luminance) component, perform the steps that were described in the JPEG Component Details on this component.

Color JPEG Codec: Initialize on the SoF (start of frame). Finalize on the EoF (end of frame). Wait for all the components to complete. Then copy the component buffers to the codec buffer and report the codec complete.

JPEG Yc: Yc (gray) component, perform the steps that were described in the JPEG Component Details on this component.

Section 7b: JPEG 2000

Overview: The JPEG-2000 compression standard is implemented to achieve a "lossless" compression, which otherwise is not possible with the JPEG standard. This newer standard can be selected by the user instead of JPEG, to achieve the lossless compression. The significant difference in terms of practicality is with the computational resources, and JPEG2000 uses significantly more computations and is a more sophisticated method than the standard JPEG. However, there are advantages to this standard over the JPEG. JPEG2000 has a better compression rate and improved image quality than JPEG, although the image file size will be bigger.

JPEG-2000 standard algorithm stages/steps: The standard algorithm stages of a JPEG 2000 codec is given below. The exact implementation stages are listed in detail following this subsection.

The input image (RGB) is converted to a reversible YUV (Y-luminance component, U&V—chrominance components; U-blue projection, V=red projection https://en.wikipedia.org/wiki/YUV) mode in the first module. Next stage is tiling, where the image can be fed as a whole image or divided into tiles to the transformation stage. The 2-dimensional discrete wavelet transform (DWT) decomposes each tile into various sub-bands in the frequency domain. A reversible transform is used here (Le Gall 5-tap/3-tap filter) for lossless compression. The transformed data stream is quantized using scalar quantization. The quantizer indices are entropy encoded using an adaptive binary arithmetic coder. The arithmetic coding is context-based to efficiently compress each bit plane.

JPEG2000 Implementation overview: JPEG 2000 is utilized for lossless image file output. Jpeg 2000 specifies a stream format for transmission/storage of image data as well as a file format for encapsulating the stream. The stream decomposes an image into 1 or more "tiles". Tiles are further decomposed by component, resolution level, band, precinct, and code block; with code blocks being the smallest encoded element. The tiling is utilized to provide the capacity for high-level multiprocessing within the codec pipeline; overall, the pipeline consists of 70+ stages. Color and Grey scale are essentially the same—with Grey Scale utilizing only a single component (with three color components in color image) and not requiring a format conversion.

JPEG2000 implementation stages: The standard JPEG 2000 algorithm is implemented in various stages in the scanner image processing system in the following way. This implementation makes use of the cascading pipeline concept explained earlier to speed up different stages by executing them in parallel. Some of the stages here are split into multiple sub-stages to utilize the cascading pipeline execution.

Implementation Stage 1: The initial stage receives and converts Unit of Work (UOWs) (from the image processing pipeline) to UOWs suitable for the codec. The codec is initialized on SOF (start of frame), generating the tile configuration to be utilized. Tiles are fitted to the image dimensions and the image dimensions are reduced (by shrinking from the bottom right) to ensure dimensions are divisible by 2 (even value). Converted UOWs are pushed onto the codec pipeline and at EOF, Implementation Stage 2: The second stage provides format conversion (RGB to YUV)—this stage is omitted for grey scale.

Implementation Stage 3: The third stage gather, decomposes and buffers the UOWs' data to tile components, where each component represents a unique pipeline for processing. Tile components s intersecting the UOW are updated accordingly—with the first intersecting UOW initializing the compression structure for the tile component, and the last intersecting UOW initiating the compression process.

Implementation Stage 4: Each tile component is processed as a pipeline where the UOWs carry a tile reference rather than image data. The initial component stage receives a tile and prepares it for Discrete Wavelet Transformation (DWT) process which is implemented in subsequent stages. The resulting components stages are organized as 1 stage for each resolution level utilized—our implementation uses three resolution levels (the minimum). Because of the nature of the DWT, actual quantization and entropy encoding cannot be accomplished until finalization of the transform.

Implementation Stage 5: The final DWT component stage above initiates quantization and entropy encoding on a unique pipeline with up to 20 stages, where the stages are associated with each potential bit position in the DWT coefficients (output). Quantization and entropy encoding operate on UOWs which carry individual code blocks as assigned at component initialization with discrimination by tile boundary. Each code block is a self-contained temporary stream which is consumed at tile serialization.

Section 8: Bitonal Conversion (Binarization)

Introduction and objective: The bitonal conversion or widely called binarization module converts a 24-bit color raw image into a binary image of 0s and 1s. The objective is to pass the raw image through a decision-making process, where each pixel is decided whether to be a foreground or background. The foreground or background definition can vary depending on the application, but for general office documents, the text is considered as foreground, and the document texture is the background. In a practical sense, any information in the document that may be desired to be retained is the foreground, and any information that is deemed to be discarded is the background. While a 24-bit color image has 8 bits each for three color channels, and each channel has may have values in the range of 0-255, the output bitonal image has two possible values, 0 and 1.

The binarization method implemented here is a modified version of Otsu's method. The Otsu's method uses standard deviation for image thresholding. Here, instead of the standard deviation, entropy analysis is performed to find the threshold.

Depending on the type of document, the background/foreground values may be assigned differently; for example, on a light/white document with dark text content, the foreground is dark text or 0s, and background is the light areas or 1s. Thus, a bitonal or binary image can be represented by a significantly lesser number of bits leading to lesser memory requirements, which is a driving factor for storage purposes as wells as various post-processing stages such as information extraction and analysis.

Overview of bitonal conversion algorithm: The binarization process operates on the luminance or Y channel of a YCC image (RGB to YCC conversion of the captured scan lines). This Y channel is fed into two separate threshold determination steps, namely edge threshold and background threshold. These two steps serve different purposes: edge threshold is used to enhance the edges, while the background threshold removes most of the 'background' pixels while retaining the relevant content of the document, or the foreground. The edge threshold stage outputs a positive and negative edge threshold, which is used to enhance either side of the edges.

Following the threshold estimation, a mask created from the edge threshold is applied to the Y channel image, and this stage is followed by a background thresholding operation. The resulting image should have the edges enhanced, and most of the background removed. The resulting image may contain dark speckles or spots, which are the artifacts from the background thresholding operation. These are removed using a despeckling algorithm while retaining the valid contents. The resulting image is compressed, and TIF wrapped to write it as an output image in the memory.

Background threshold: The background threshold determination can be considered as the critical stage in any binarization process. The difficultly with this stage is to intelligently modify each pixel to a binary value. This step can be thought as a decision-maker that inspects the pixel value and related characteristics to analyze and decide on which binary value (0 or 1) should be assigned.

The threshold estimation process begins with the histogram and entropy analysis of the input luminance image. The histogram represents the pixel gray value variation across the image and can be generated by plotting the gray values from 0-255 (8 bits) against the density for each gray-value bin.

Entropy refers to the amount of disorder—higher values indicate lower order, while lower values indicate higher order. In the case of a histogram, the highest entropy represents the least significant level to the overall histogram If considering a bimodal distribution, then the highest entropy represents the best value for a threshold that divides foreground and background.

Tonal groups are regions of the image belonging to similar grayscale values; for example, in a bitonal image, the zero regions and one's regions represent two tonal groups. The background threshold estimation is initiated by considering the point of highest entropy (of the image histogram) as an initial threshold. This threshold would be ideal in document classes, especially one with a plain text and light background. However, a variety of other documents with dark or textured background, presence of images/graphics, watermarks, and other complex content can cause this initial threshold to not fairly demarcate between tonal groups.

Figure 23:
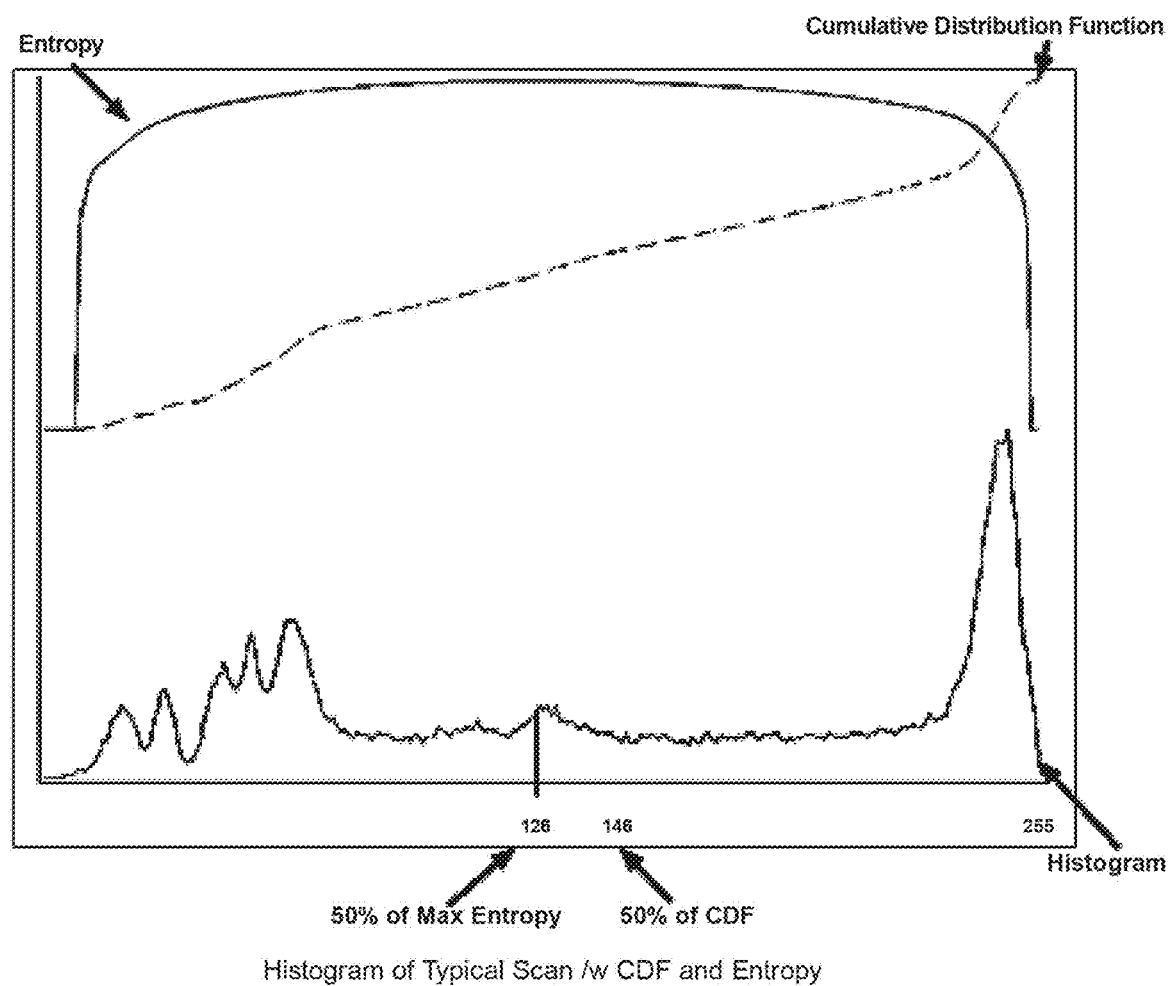
FIG. 23 shows an example of the histogram, entropy, and CDF curves in a document.

[Bitonal terms definition] The entropy, as described earlier, is plotted from the histogram of the image (see FIG. 23). The first, second, and third derivatives of the entropy are also calculated to aid with the entropy analysis and threshold correction. Tonal groups in an image represent the cluster of regions that belong to a certain gray value or color. These tonal groups can be visually seen as various peaks in the image histogram. These tonal groups are identified in most cases by the zero-crossings in the $3^{rd}$ derivate of the entropy, and in other cases, by the direction change. The zero-crossing of a particular curve represents the location or the point of the curve where it crosses zero. Lead-in and lead-out are the velocity estimations of the entropy-derivate curves. These are calculated by measuring the velocity of a curve at the beginning and end of the entropy. The lead-in and lead-out are used to determine the entropy extents. The entropy extent denotes the range of entropy curve that is valid and used for further analysis while excluding any noise or artifacts. Lead-ratio is the normalized ratio of lead-out by lead-in. CDF or cumulative distribution function represents the probability or likelihood of the presence of certain histogram bins or pixel intensities. The cumulative distribution function is the area under the probability distribution function calculated from an image histogram.

[Example cases] A few examples of how this decision making is performed is given below:

First decision making in most cases to identify the type of document being scanned—whether it is a light document with dark background, or a dark document with light background. This is performed by inspecting the significant peak of the histogram in comparison with the CDF ratio—if this peak is left of CDF at a predetermined level, for example, 50%, then a light document with dark background is assumed and if to the right side of CDF, a light background document with dark text is assumed.

A document with a light background and light-colored text (low contrast) can cause detection problems if decision is made on a global threshold. Here, the entropy is estimated to be narrow, which indicates that the document is mostly blank, and in that case, the threshold is 'retreated' or reduced from the initial threshold. Nevertheless, if other tonal groups are present around and surrounding the light print, then the threshold may be advanced/incremented or increased from the initial threshold.

In a document where the presence of various regions with different color regions or gray areas, can result in multiple tonal groups close to each other in the histogram. In this case, due to the closeness of these tonal groups, a zero-crossing may not be evident, and thus the velocity or change in direction is estimated instead to advance or retreat the background threshold.

The final background threshold is therefore, calculated by analyzing the context and content of the document the above set of characteristics are used to decide the amount of variation to be incorporated into the highest entropy or initial threshold. This finalized value is used to threshold the image so that any pixel value below this determined threshold is removed, and any pixel value higher or equal to this threshold is retained.

[Edge thresholding overview] Edges in a document refer to the transition from one luminance value to another luminance value. This gradient or transition has a magnitude and direction. The edge magnitude represents the amount of pixel value change in that transition, and the direction indicates whether the edge is from light to dark transition (negative edge) or dark to light transition (positive edge). The edge threshold is composed of a positive threshold and a negative threshold. These are aimed to enhance the negative and positive edges separately, thus equally enhancing both sides of an edge and improving the visual image quality.

[Edge thresholding Details] The positive and edge thresholds are determined based on the gradient analysis and using some of the histogram and entropy characteristics, as described in the earlier section of the background threshold. However, there are some differences here. The input luminance channel is fed into a Laplace transform operator to derive the X-direction (horizontal) and Y-direction (vertical) derivatives. The histogram of these derivatives are calculated, which is a normal distribution and the center of this distribution is considered as a reference zero or origin. The entropy of this entire histogram is calculated, and this entropy is analyzed in two parts: one from center to left (for negative edges), and the other from center to right (for positive edges). A constrained peak of these entropy curves is estimated using a cumulative distribution function or CDF. First, the upper and lower extents of the entropy is calculated and the maximum entropy that fit within the entropy extent limits are initialized as the positive and negative edge thresholds on both sides of the origin or zero point.

[Edge balance option] An edge balance value is available in the configuration to be adjusted. This value allows the user to move the edge threshold up or down the selected edge threshold value. This is again constrained to fit within the minimum and maximum CDFs. And thus, a threshold below or beyond the entropy extent is prevented in this case.

[Edge enhancement—Dx and Dy masks:] The objective of edge enhancement is to make the edges look sharp rather than like a hysteresis where the edges may be blurry. Visual quality of documents significantly relates to the edge sharpness. The gradual transition of edges in a document image can complicate the recognition of edges/text. Thus, a process to enhance the edges is needed to provide sharper edge transitions.

Figure 24:
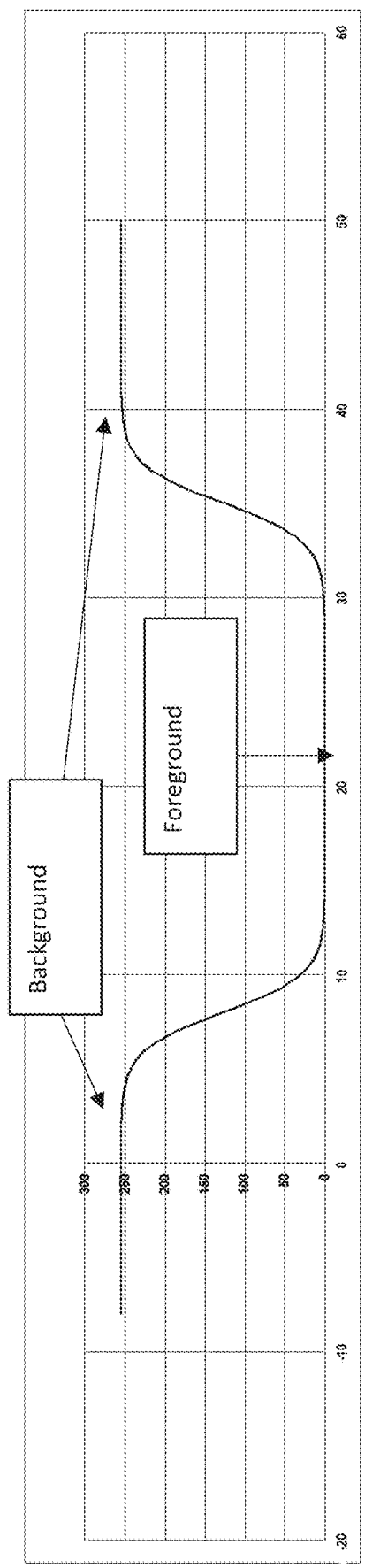
FIG. 24 shows the graph of edge transition in luminance values.

FIG. 24 shows a graph of luminance values of a hypothetical portion of one scan line edge transition from light, typically background (graph values at 255) to dark, typically foreground (graph values at 0) and back to light (graph values at 255) in the X direction (left to right) in the image.

Figure 25:
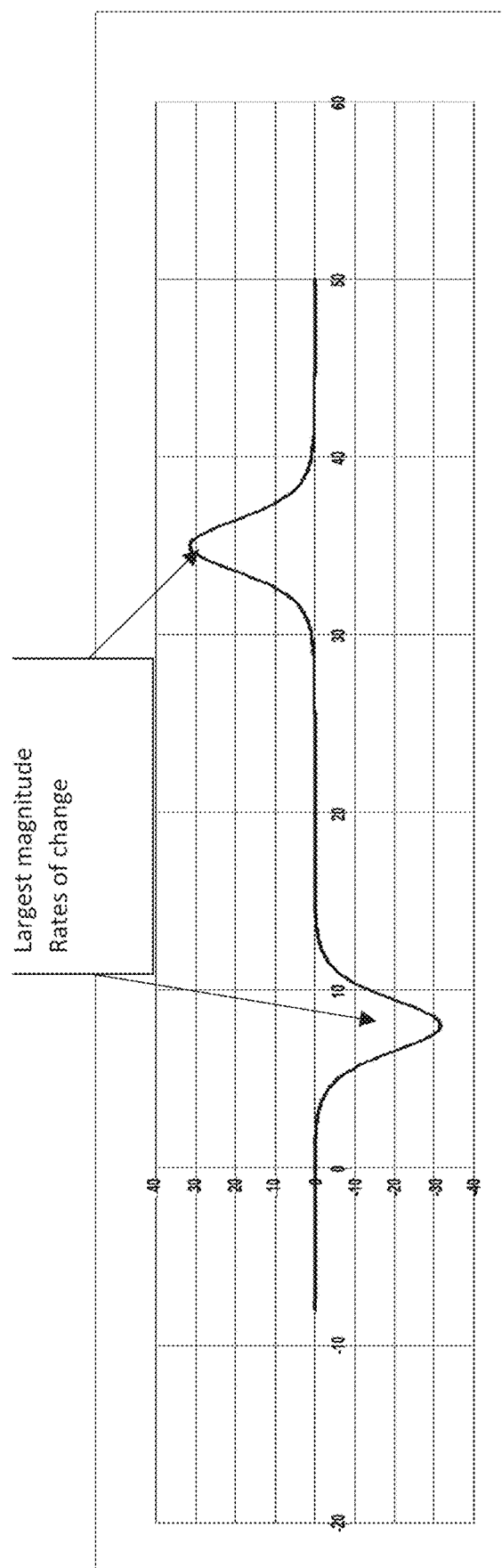
FIG. 25 shows the first derivative of edge transition luminance graph.

A derivative of this graph, see FIG. 25, helps to identify areas where the rate of intensity change is large, most likely indicating where an edge is located.

From the first derivative, the positive edge threshold is applied, and only the values above a predetermined edge threshold are kept. Additionally, the negative edge threshold is applied, and again, only the values below a predetermined edge threshold are kept. These two regions of interests are then evaluated further by inspecting the second derivative.

Figure 26:
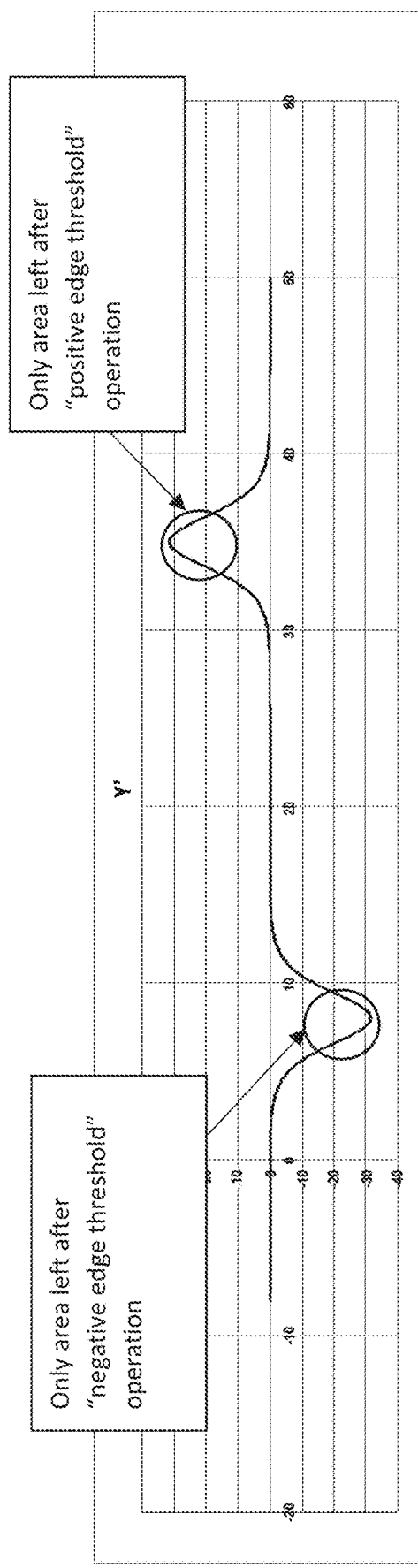
FIG. 26 shows the region of interest where the edge threshold is applied.
Figure 27:
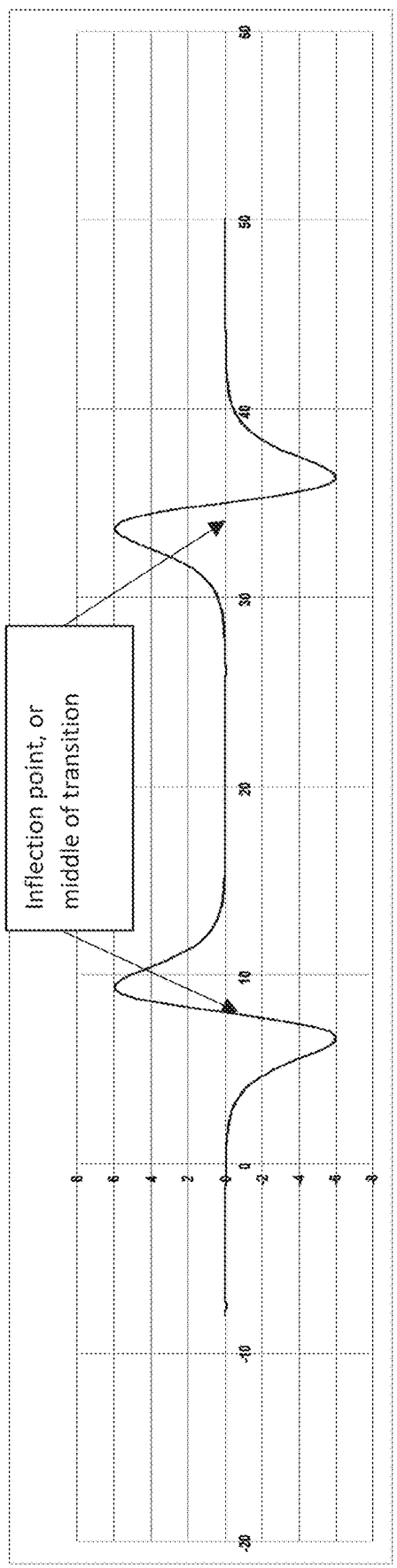
FIG. 27 shows the second derivative of edge transition luminance graph.

A second derivative of this graph (denoting the rate of change of the first derivative), see FIG. 26, provides the inflection point (middle/zero-crossing) of the transition from light to dark (or dark to light) of the regions of interest. This graph determines whether to change pixel luminance values to 0 or 255. The preferred point is the middle of the transition between peaks as shown in FIG. 27.

The next stage applies the edge threshold generated earlier in the bitonal conversion process to the region of interests in the second derivative graph. For pixels where the second derivative is positive, the luminance values in the mask is set to 0 (setting to identify a foreground). And for those pixels where the second derivative is negative, the mask luminance values are modified to 255 or other higher number than the foreground number (setting to identify a background).

This process continues for all scan lines in the X direction, which is followed by the same process applied in the Y direction (top to bottom) of the document. Note the scan lines for the Y direction are obtained from the orthogonal buffer generated during landing. By landing pixels orthogonally, no rotation of pixels is needed at this point in the process and thus it provides a processing speed up.

At the end of the masking stage, there is a mask matrix that contains values for every pixel to either change the luminance value to 0, change the luminance value to 255 or no change. This mask will be applied in the threshold stage.

When applied, this masking process enhances the edges and makes a clean break from background to foreground. Then, the background threshold can be applied to binarize the image. Both these steps occur in later stages of the process.

Adaptive/Static—Background threshold: The background threshold has two options for threshold determination: The static threshold may be specified in the configuration setup as a predetermined value, and a hard threshold the image based on this value. For example, consider a static threshold of T and the luminance pixel values below T are 0s and above or equal to T are labeled as is.

While in the adaptive threshold, the histogram and entropy analysis mentioned in the background thresholding section is utilized to estimate a threshold depending on the image type and content.

Adaptive/Static—Edge threshold: The static threshold configured is assumed as the negative and positive edge threshold and is applied to the positive and negative document edges. The initial stage of this process determines the edge locations in the document by analyzing the first, second, and third derivatives of the histogram, as mentioned in the edge enhancement section above.

The adaptive threshold again relies on the positive and negative edge locations, and instead of applying a hard value as the threshold, gradient analysis of the document content is used to estimate an edge threshold.

Despeckling algorithm: Speckles are undesired artifacts that may appear as part of the bitonal conversion. Speckles typically occur due to edge enhancement in the background where texture changes may be enhanced; additionally, speckles are intentionally incorporated in some documents as a security feature. These dark speckles/regions that do not belong to the foreground are removed for a clean and visually enhanced document. This is accomplished using a connected segment analysis.

The input scan lines are inspected for identifying pixel segments that are connected to each other. This is implemented based on filtering the output from a modified connected segments algorithm; accomplished in three stages of the bitonal codec operating on each UOW (bitonal scan line). The first stage forms "modules" of connected dark pixels within each scanline. The second stage connects (using 8 way connectivity) modules on the previous scan line to modules on the current scan line forming "connected segments". The third stage observes the mass (collected sum of dark pixels), and the diagonal (of encompassing rectangle) of each connected segment; whitening objects that are found to be under threshold criteria where the criteria are formed by speckle size specified in 100ths of an inch (up to 5 100ths of an inch).

The description of the invention and its applications as set forth above is illustrative and is not intended to limit the scope of the invention. Variations and modifications of the embodiments disclosed herein are possible and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

BACKGROUND CITATIONS https://en.wikipedia.org/wiki/Kullback%E2%80%93Leibler_divergence:
https://en.wikipedia.org/wiki/HSL_and_HSV
https://en.wikipedia.org/wiki/Libjpeg
https://en.wikipedia.org/wiki/Canny_edge_detector
http://pequan.lip6.fr/~bereziat/pima/2012/seuillage/kapur85.pdf
http://www.simplesystems.org/libtiff/
https://en.wikipedia.org/wiki/Otsu%27s_method
https://en.wikipedia.org/wiki/Hough_transform.

What is claimed is:

1. A method of high throughput scanning image data of a document from a line scanning camera signally connected to a host PC, optical sensors, and a document track delivering a document along the document track at a predetermined speed through a field of view of the line scanning camera illuminated by a light source, comprising:
receiving image data from the line scanning camera as a plurality of sequential scan lines;
landing a full frame of image data of the document from a camera interface device of the line scanning camera to a continuous memory of the host PC,
including a set of the plurality of sequential scan lines received between a start of frame signal from the optical sensors and an offset after an end of a frame signal from the optical sensors;
framing the full frame of image data as a plurality of units of work to distinguish a region of interest from the image data of the document track so that the region of interest comprises primarily image data of the document;
processing of image data within the region of interest as the plurality of units of work respectively constructed and reconstructed according to each of user configurations of an output image data of the document;
wherein landing the full frame of image data of the document comprises: storing the plurality of sequential scan lines from the line scanning camera in a color format in a normal orientation, in an orthogonal orientation perpendicular to the normal orientation, and in a grayscale formation in the normal orientation respectively in arrays accessible in the continuous memory of the host PC; and
wherein framing the full frame of image data comprises:
calculating a threshold luminance by multiplying a predetermined gain factor to an average document tract luminance;
initiating a search for bounding points which define at least one edge before a last line of image data of a full frame image is landed;
searching along a first direction for a found point within each of the plurality of units of work, wherein the point has a luminance above the threshold luminance for a predetermined number of continuous pixels;
for a found point which has a luminance above the predetermined threshold luminance, assigning it to be a bounding point of the unit of work;
terminating said search within the unit of work once the bounding point is found; and
assigning all the bounding points found along a first direction to be a first bounding point collection,
wherein each unit of the plurality of units of works represents image data in a line of the plurality of sequential scan lines,
wherein the first direction is from a selected one of:
left to right,
right to left,
top to bottom, or
bottom to top,
wherein the searching starts from a selected one of:
a left most pixel,
a right most pixel,
a top most pixel, or
a bottom most pixel.

2. The method of claim 1 further comprising:
searching in a second direction opposite from the first direction, substantially simultaneously, for a point within each of the plurality of units of work, wherein the point having a luminance above the predetermined threshold luminance for a predetermined number of continuous pixels;
for a found point having a luminance above the threshold assigning said found point to be a bounding point of the unit of work;
terminating the search along a second direction within the unit of work once the bounding point is found; and
assigning all the bounding points found along the second direction to be a second bounding point collection,
wherein the second direction is from a selected one of:
left to right,
right to left,
top to bottom, or
bottom to top,
wherein the searching starts from a selected one of:
a left most pixel,
a right most pixel,
a top most pixel, or
a bottom most pixel.

3. The method of claim 2, further comprising:
searching along a third direction orthogonal to the first direction, for a bounding point within each of a plurality of units of work and between a first bounding point found in the searching on the first direction and a second bounding point on the searching on the second direction,
wherein each of the plurality of units of work is a line of pixels orthogonal to the first direction,
wherein the point having a luminance above the threshold luminance for a predetermined number of continuous pixels;
for a found point having a luminance above the threshold assigning said found point to be a bounding point of the unit of work;
terminating the search along the third direction within the unit of work once the bounding point is found; and
assigning all the bounding points found along the third direction to be a third bounding point collection,
wherein each unit of the plurality of units of works represents image data in a line of the plurality of sequential scan lines that are orthogonal to the first direction,
wherein the third direction is from a selected one of:
left to right,
right to left,
top to bottom, or
bottom to top,
wherein the searching starts from a selected one of:
a left most pixel,
a right most pixel,
a top most pixel, or
a bottom most pixel.

4. The method of claim 3, further comprising:
searching along a fourth direction opposite of g the third direction, for a bounding point within each of a plurality of units of work between a third most bounding point found in the searching on the first direction and a fourth most bounding point on the searching on the second direction,
wherein each of the plurality of units of work is a line of pixel orthogonal to the first direction,
wherein the point having a luminance above the predetermined threshold luminance for a predetermined number of continuous pixels;

for a found point having a luminance above the threshold assigning said found point to be a bounding point of the unit of work;

terminating the search along the fourth direction within the unit of work once the bounding point is found; and assigning all the bounding points found along the fourth direction to be a fourth bounding point collection.

5. The method of claim 4, wherein calculating the threshold luminance and searching for bounding points on the first, second, third, and forth directions using a grayscale array of the full frame of image data stored in a contiguous memory address.

6. The method of claim 1, further comprising:
initiating critical point searching by:
assigning a coordinate of one of the bounding points to be a first critical point;
continue searching for collinear bounding points by the following steps:
(1) searching for a first nearest bounding point in a clockwise or counterclockwise direction;
(2) creating a line segment between the one of the bounding points and the nearest bounding point;
(3) searching for a next nearest bounding point following the same clockwise or counterclockwise direction;
(4) testing whether the next nearest bounding point is collinear with the line segment:
if the next nearest bounding point is collinear with the line segment, searching for a next nearest bounding point from the next nearing bounding point following the same clockwise or counter-clockwise direction until a predetermined number of collinear bounding point is found, or a non-collinear bounding point is found; and
assigning the number of collinear points found to be a weight of the first critical point;
if the next nearest bounding point is not collinear with the line segment, assigning the number of collinear points found to be a weight of the first critical point;
(5) assigning a next bounding point following the same clockwise or counterclockwise direction to be a next critical point; and
(6) repeating searching steps (1) to (5) until a predetermined percentage of the bounding points are tested, wherein the predetermined percentage is substantially all bounding points.

7. The method of claim 1, further comprising:
calculating a credence value for a first ROI edge calculated from a Recursive Hough Transform Algorithm, a second ROI edge calculated from the Recursive Hough Transform Algorithm, a third ROI edge calculated from the Recursive Hough Transform Algorithm, a fourth ROI edge calculated from the Recursive Hough Transform Algorithm, said first ROI edge calculated from the Edge Construction Algorithm, said second ROI edge calculated from an Edge Construction Algorithm, said third ROI edge calculated from the Edge Construction Algorithm, and said fourth ROI edge calculated from the Edge Construction Algorithm respectively;
wherein the credence value of a ROI edge is a ratio between a number for the bounding points on the ROI edge and a total number of the bounding points of the corresponding projection;
wherein a ROI edge is line segment calculated from either a Recursive Rough Algorithm or Edge Construction Algorithm using critical points.

8. The method of claim 7, further comprising:
selecting a final first, second, third, and fourth ROI edge from the [first, second, third, and fourth ROI edges calculated from the recursive Hough Transform Algorithm and the Edge Construction Algorithm respectively according to following conditions:
(1) selecting a ROI edge calculated from the Recursive Hough Transform Algorithm if:
the ROI edged calculated from the Recursive Hough Transform Algorithm having a credence value between a predetermined credence threshold of Hough Transform and a higher predetermined credence threshold of Hough Transform, and
a corresponding ROI edged calculated from the Edge Construction Algorithm having a credence value below a predetermined credence threshold for Edge Construction,
(2) selecting a ROI edge calculated from the Recursive Hough Transform Algorithm if the ROI edged calculated from the Recursive Hough Transform Algorithm having a credence value above the higher predetermined credence threshold of Hough Transform,
(3) selecting a corresponding frame extent edge as a ROI edge if:
a ROI edged calculated from the recursive Hough Transform Algorithm having a credence value below a predetermined credence threshold for Hough Transform, and
the corresponding ROI edged from the Edge Construction Algorithm having a credence below a predetermined credence threshold of Edge Construction,
(4) otherwise, selecting a ROI edge calculated from Edge Construction; and
defining a plurality of edge boundaries to be at an intersection of the selected first, second, third, and fourth edges to define the region of interest.

9. The method of claim 8, further comprising:
shifting the selected ROI edges away from a center of the full frame of image data and perpendicular to the ROI edge until a predetermined portion of bounding points are inside the region of interest if the selected ROI edges are selected from the ROI edges calculated from Recursive Hough Algorithm or the Edge Construction Algorithm;
shifting the selected ROI edges towards the center of the full frame of image data and perpendicular to the ROI edge until the edge becomes tangential with one or more bounding points if the ROI edges are selected from the frame extent edges; and
storing a framing data according to coordinate of the shifted ROI edges in the memory of the host PC.

10. The method of claim 1, wherein landing, framing, and image processing are conducted in a pipeline including a plurality of sub-pipelines comprises: a landing and framing sub-pipeline, a pre-codec image processing sub-pipeline, and a codec image processing sub-pipeline, wherein the pipeline further associated with a management object with a callback process, comprises: a control object managing a Landing and Framing Process controller and an Image Processing Process controller that synchronize interactions between the landing and framing sub-pipeline, the pre-codec processing sub-pipeline, and the codec processing sub-pipeline.

11. The method of claim 10, wherein landing further comprising: storing landed image data in a circular buffer comprises a predetermined number of kernels holding image data of documents, wherein each kernel comprises image data associated with a single document.

12. The method of claim 11, wherein landing further comprising:

subdividing image data into a plurality of UOWs according to substituent stages, and redistribute the image data into a different plurality of UOWs according to different stages.

13. The method of claim 12, wherein landing further comprising:

establishing a UOW pool having a predetermined number of uninitialized UOW objects in the UOW pool so that only a limited number of UOWs can be entered into a pipeline at a given time avoiding pipeline overload;

initializing UOW objects by assigning data sets into the UOW objects according to the respective stage and creating initialized UOW loaded with the data sets, wherein data sets comprise image data, framing data, or the image data and the framing data; and returning UOW object to the UOW pool after the respective stage is completed so that the UOW objects can be initialized again to process image data.

14. The method of claim 13, wherein the plurality of sub-pipelines comprises:

a plurality of stages sequentially connected in series wherein image data configured in UOWs cascading through a first stage to a last stage according to a configuration of the pipeline, wherein each of the plurality of stages having abstract inputs and outputs so that one or more of stages can be added, inserted, and removed according to user configurations and without reconfiguring the rest of stages, wherein a stage comprises a set of CPU instructions specific to the stage.

15. The method of claim 14, wherein the controller object generates a list of passes according to the user's image output configurations, wherein a pass comprises a collection of stages that has been configured to accomplish a set of user output configurations and translating framing data into output coordinate data according to requirements of the pass.

16. The method of claim 1, wherein the processing of image data further comprising:

a pre-bitonal process comprises:
calculating derivatives of a luminance level of the image data in the normal and the orthogonal orientation; and
generating a histogram curve for a bitonal process,
wherein the bitonal process comprises:
an edge enhancement process comprises establishing two edge enhancement thresholds, generating an edge enhancement mask, and applying the generated edge enhancement mask;
a background thresholding process comprises establishing a bitonal background threshold, and applying the bitonal background threshold; and
an output.

17. The method of claim 16, wherein the edge enhancement thresholds are determined by an entropy information analysis using a histogram data from the pre-bitonal process for a first time to determine a threshold for a transition from the document track to the document and for a second time to determine a transition from the document to the document track, and the bitonal background threshold is determined by the entropy information analysis using a histogram data of the luminance value for each pixel in grayscale, wherein the entropy information analysis comprises:

generating an entropy curve from the histogram data and overlaying the entropy curve and the histogram data;
locating one of a plurality of predetermined features of the entropy curve, selecting a corresponding histogram bin,
adjusting the corresponding histogram bin according to the other of the plurality of predetermined features;
assigning an adjusted histogram bin to be one of the edge enhancement thresholds or a bitonal background edge enhancement threshold; and
wherein the plurality of predetermined features of the entropy curve is peaks, valleys, shelves, and zero-crossings of the entropy curve.

18. The method of claim 17, further comprising a de-speckle process removing speckles in the image data when the speckles are within a diagonal threshold, wherein the speckles are generated due to prior image processing or are physically emended in the documents comprising paper textures and security features.

* * * * *